US009830176B2

(12) United States Patent
Andrus et al.

(10) Patent No.: US 9,830,176 B2
(45) Date of Patent: Nov. 28, 2017

(54) METHODS, SYSTEMS, AND MEDIA FOR BINARY COMPATIBLE GRAPHICS SUPPORT IN MOBILE OPERATING SYSTEMS

(71) Applicants: Jeremy Andrus, New York, NY (US); Naser AlDuaij, New York, NY (US); Jason Nieh, New York, NY (US)

(72) Inventors: Jeremy Andrus, New York, NY (US); Naser AlDuaij, New York, NY (US); Jason Nieh, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 14/719,119

(22) Filed: May 21, 2015

(65) Prior Publication Data

US 2015/0339137 A1    Nov. 26, 2015

Related U.S. Application Data

(60) Provisional application No. 62/001,436, filed on May 21, 2014, provisional application No. 62/164,264, filed on May 20, 2015.

(51) Int. Cl.
*G06F 9/44* (2006.01)
*G06F 9/455* (2006.01)

(52) U.S. Cl.
CPC ........ *G06F 9/4552* (2013.01); *G06F 9/45516* (2013.01)

(58) Field of Classification Search
None
See application file for complete search history.

(56) References Cited

U.S. PATENT DOCUMENTS

| 5,666,519 | A  | 9/1997 | Hayden |
| 6,745,385 | B1 | 6/2004 | Lupu et al. |
| 7,210,132 | B2 | 4/2007 | Rivard et al. |
| 7,555,746 | B2 | 6/2009 | Fleischer |

(Continued)

OTHER PUBLICATIONS

Alexa Internet, Inc. "Alexa—Top Sites in United States", Apr. 2014, pp. 1-6, available at: http://www.alexa.com/topsites/countries/US.

(Continued)

*Primary Examiner* — Qamrun Nahar
(74) *Attorney, Agent, or Firm* — Byrne Poh LLP

(57) ABSTRACT

Methods, systems, and media for binary compatible graphics support in mobile operating systems are provided. In some embodiments, binary compatible graphics support can be provided by extending diplomatic functions to perform library-wide prelude and postlude operations in the context of the foreign operating system before and after domestic library usage. In some embodiments, binary compatible graphics support can be provided by using thread impersonation approaches that allow one thread to temporarily take on the persona of another thread to perform some action that may be tread-dependent. In some embodiments, binary compatible graphics support can be provided by using dynamic library replication approaches that load multiple, independent instances of a single library within the same process.

15 Claims, 12 Drawing Sheets

(56) References Cited

U.S. PATENT DOCUMENTS

| | | | |
|---|---|---|---|
| 7,689,566 | B1 | 3/2010 | Nieuwejaar et al. |
| 7,930,705 | B2 | 4/2011 | Vo et al. |
| 7,945,915 | B1 | 5/2011 | Nieuwejaar |
| 8,127,107 | B2 | 2/2012 | Devine et al. |
| 8,875,159 | B1 | 10/2014 | Nieuwejaar et al. |
| 2008/0034377 | A1 | 2/2008 | Vo et al. |
| 2009/0300263 | A1 | 12/2009 | Devine et al. |
| 2013/0338993 | A1* | 12/2013 | Zhong .................... G06F 9/455 703/23 |
| 2015/0339137 | A1 | 11/2015 | Andrus et al. |
| 2016/0077850 | A1 | 3/2016 | Andrus et al. |

OTHER PUBLICATIONS

Amstadt, B. and Johnson, M.K., "Wine", In Linux Journal, Aug. 1994, pp. 1-6.

Anderson, C.L. and Nguyen, M., "A Survey of Contemporary Instructional Operating Systems for use in Undergraduate Courses", In Journal of Computing Sciences in College 21, Oct. 2005, pp. 183-190.

Andrus, A., et al., "Chameleon: Multi-Persona Binary Compatibility for Mobile Devices." In: Technical Report CUCS-011-13, Department of Computer Science Columbia University, Apr. 8, 2013, pp. 6-10, available at: http://www.cs.columbia.edu/resources/techreports.

Andrus, A., et al., "Cider: Native Execution of iOS Apps on Android", In Proceedings of the 19th International Conference on Architectural Support for Programming Languages and Operating Systems, Salt Lake City, UT, US, Mar. 1-5, 2014, pp. 367-382.

Andrus, J., et al, "Teaching Operating Systems Using Android", In Proceedings of the 43rd ACM Technical Symposium on Computer Science Education, Feb. 2012, pp. 613-618.

Andrus, J., et al., "Cells: A Virtual Mobile Smartphone Architecture", In Proceedings of the 23rd ACM Symposium on Operating Systems Principles, Cascais, PT, Oct. 2011, pp. 173-187.

Apalon Apps., "Calculator Pro for iPad Free on the App Store on iTunes", Dec. 2013, pp. 1-2, available at: https://itunes.apple.com/us/app/calculator-pro-for-ipad-free/id749118884.

Apple Inc., "Networking & Internet Starting Point", Apr. 2011, pp. 1-3, available at: http://developer.apple.com/library/ios4referencelibrary/GettingStarted/GS_Networking_iPhone/index.html.

Apple Inc., "OS X ABI Mach-O File Format Reference", Feb. 2009, pp. 1-8, available at: https://developer.apple.com/library/mac/#documentation/DeveloperTools/Conceptual/MachORuntime/Reference/reference.html.

Apple, Inc. "SunSpider 1.0.2 JavaScript Benchmark", last accessed Mar. 29, 2013, pp. 1, available at: http://www.webkit.org/perf/sunspider/sunspider.html.

Apple, Inc. "Xcode Overview: About Xcode", Mar. 2014, pp. 1-135, available at: http://developer.apple.com/library/mac/documentation/toolsLanguages/conceptual/Xcode_Overview/About_Xcode/about.html.

Apple, Inc., "Components of the System Configuration Framework", Feb. 2006, pp. 1-62, available at: https://developer.apple.com/library/mac/#documentation/Networking/Conceptual/SystemConfigFrameworks/SC_Components/SC_Components.html.

Apple, Inc., "dyld(1) OSX Manual Page", Dec. 2009, pp. 1-5, availabe at: http://developer.apple.com/library/mac/#documentation/Darwin/Reference/Manpages/man1/dyld.1.html.

Apple, Inc., "Grand Central Dispatch (GCD) Reference", Nov. 2011, pp. 1-7, available at: https://developer.apple.com/library/ios/#documentation/Performance/Reference/GCD_libdispatch_Ref/Reference/reference.html.

Apple, Inc., "iOS Device Compatibility Reference: OpenGL E3 Graphics", Feb. 2014, pp. 1-30, available at: http://developer.apple.com/library/ios/documentation/DeviceInformation/Reference/iOSDeviceCompatibility/OpenGLESPlatforms/OpenGLESPlatforms.html#//apple_ref/doc/uid/TP40013599-CH106-SW1.

Apple, Inc., "Kernel Programmin Guide: Mach Overview", Aug. 2013, pp. 1-197, available at: http://developer.apple.com/library/mac/documentation/Darwin/Conceptual/KernelProgramming/Mach.Mach.html.

Apple, Inc., "Networking Overview", Jan. 2013, pp. 1-62, available at: http://developer.apple.com/library/ios/#documentation/NetowrkingInternetWEb/conceptual/NetworkingOverview/Introduction.html.

Apple, Inc., "OpenGL ES Programming Guide for iOS: Best Practices for Working with Vertex Data", Jul. 2014, pp. 1-14, available at: https://developer.apple.com/library/ios/documentation/3ddrawing/conceptual/opengles_programmingguide/TechniquesforWorkingwithVertexData/TechniquesforWorkingwithVertexData.html.

Apple, Inc., "OpenGL ES Programming Guide for iOS: Configuring OpenGL ES Contexts", Sep. 2013, pp. 1-4, available at: https://developer.apple.com/library/ios/documentation/3DDrawing/Conceptual/OpenGLES_ProgrammingGuide/WorkingwithOpenGLESContexts/WorkingwithOpenGLEScontexts.html.

Apple, Inc., "OpenGL Programmin Guide for iOS: Drawing to Other Rendering Destination", Mar. 2014, pp. 1-11, available at: https://developer.apple.com/library/ios/documentation/3ddrawing/conceptual/opengles_programmingguide/WorkingwithEAGLContexts/WorkingwithEAGLContexts.html.

Apple, Inc., "Porting UNIX/Linus Applications to OS X", Jun. 2012, pp. 1-91, available at: https://developer.apple.com/library/mac/#documentation/Porting/Conceptual/PortingUnix/background/background.html.

Apple, Inc., "SCNetworkReachability Reference", Jan. 2013, pp. 1-2, available at: http://developer.apple.com/library/mac/#documentation/SystemConfiguration/Reference/SCNetworkReachabilityRef/Reference/reference.html.

Apple, Inc., "Source Browser", Aug. 2012, p. 1, available at: http://www.opensource.apple.com/source/xnu/xnu-2050.18.24/.

Apple, Inc., "The WebKit Open Source Project," Apr. 2014, pp. 1, available at: http://www.webkit.org.

Asterix, "Asterix.org" 2011 (month unknown), pp. 1-3, available at: http://www.asterisk.org.

Atkin, B and Sirer E.G., "PortOS: An Educational Operating System for the Post-PC Environment", In Proceedings of the 33rd ACM Technical Symposium on Computer Science Education, New York, NY, US, 2012 (month unknown), pp. 116-120.

Barr, K., et al., "The VMware Mobile Virtualization Platform: Is that a Hypervisor in Your Pocket?" In ACM SIGOPS Operating Systems Review, Dec. 2010, pp. 124-135.

Baumann, A., et al., "Composing OS Extensions Safely and Efficiently with Bascule", In Proceedings of the 9th ACM European Conference on Computer Systems, , Apr. 2013, pp. 239-252.

Bellard, F., "QEMU, a Fast and Portable Dynamic Translator", In Proceedings of the 2005 USENIX Annual Technical Conference, Berkley CA, 2005 (month unknown), pp. 41-46.

Bhattiprolu, S. et al., "Virtual Servers and Checkpoint/Restart in Mainstream Linux", In ACM SIGOPS Operating Systems Review, Jul. 2008, pp. 104-113.

Black Duck Software, Inc., "WebKit Open Source Project on Ohloh", Apr. 2014, pp. 1-2, available at: http://www.ohloh.net/p/WebKit.

Blazakis, D., "The Apple Sandbox", In Blackhat DC, Jan. 2011, pp. 1-26.

Bluestacks, "Run Mobile Apps on Windows PC or Mac with BlueStacks—Android App Player", 2011 (month unknown), pp. 1-7, available at: http://www.bluestacks.com/, last accessed Jul. 23, 2013.

Bowman, B., et al., "GL_OES_vertex_array_object", Apr. 2009, pp. 1-8, available at: http://www.khronos.org/registry/gles/extensions/OES/OES_vertex_array_object.txt.

Brylow, D., "An Experimental Laboratory Environment for Teaching Embedded Operating Systems", In Proceedings of the 39th

(56) References Cited

OTHER PUBLICATIONS

ACM Technical Symposium on Computer Science Education, New York, NY, 2008 (month unknown), pp. 192-196.
Cellrox, "Cellrox ThinVisor Technology", Feb. 2013, pp. 1-4, available at: http://www.cellrox.com/how-it-works/.
Chernoff, A., et al., "FX!32: A Profile-Directed Binary Translator", IEEE Micro, Mar. 1998, pp. 56-64.
Clint Bagwell Consulting, "Constitution for iPhone", Mar. 2013, pp. 1-2, available at: https://itunes.apple.com/ca/app/constitution-for-iphone-ipod/id288657710.
Connelly, et al., "j2objc—A Java to iOS Objective-C translation tool and runtime—Google Project Hosting", pp. 1-2, available at: http://code.google.com/p/j2objc/, last accessed Jul. 23, 2013.
Cox, R., et al., "Xv6—A Simple Unix-like Teaching Operating System," 2014 (month unknown), pp. 1-3, available at: http://pdos.csail.mit.edu/6.828/xv6/.
Dall, C. and Nieh, J. "KVM for ARM", In Proceedings of the Ottawa Linux Symposium, Ottawa, CA, Jun. 2010, pp. 1-12.
Dall, C. and Nieh, J., "KVM/ARM: The Design and Implementation of the Linux ARM Hypervisor", In Proceedings of the 19th International Conference on Architectureal Support for Programming Languages and Operating Systems, Mar. 2014, pp. 1-15.
Dall, C., et al., "The Design, Implementation and Evaluation of Cells: A Virtual Smartphone Architecture", In ACM Transactions of Computer Systems, Aug. 2012, pp. 1-31.
Deloitte Development, LLC., "Deloitte Predictions for the Technology, Media and Telecommunications Sector, 2011", 2011 (month unknown), pp. 1-56, available at: http://www.deloitte.com/us/telecompredictions2011.
Doleel, L., "The Darling Project", Aug. 2012, pp. 1-2, available at: http://darling.dolezel.info/en/Darling.
Dowty, M. and Sugerman, J., "GPU Virtualization on VMware's Hosted I/O Architecture", In ACM SIGOPS Operating Systems Review, Jul. 2009, pp. 73-82.
Dreyfus, E., "IRIX Binary Compatibility, Part 1", Aug. 2002, pp. 1-5, available at: http://onlamp.com/lpt/a/2623.
Dreyfus, E., "Linux Compatibility on BSD for the PPC Platform", May 2001, pp. 1-6, available at: http://onlamp.com/lpt/a/833.
Dreyfus, E., "Mac OS X Binary Compatibility on NetBSD: Challenges and Implementation", In Proceedings of the 2004 EuroBSDCon, Karlsruhe, DE, Oct. 2004, pp. 1-15.
Enterproid, Inc., "Divide", 2011 (month unknown), pp. 1-2, available at: http://www.enterproid.com.
Faraday, O., "Android is a Desolate Wasteland when it comes to Games", Oct. 2012, pp. 1-7, available at: http://www.wired.co.uk/news/archive/2012-10/31/android-games.
Free Software Foundation, "GDB: The GNU Project Debugger", Dec. 10, 2013, pp. 1-2, available at: https://www.gnu.org/software/gdb/.
FreeBSD Documentation Project, "Linux Binary Compatibility", In Free BSD Handbook, Chapter 11, 2000 (month unknown), pp. 1-6.
FreeBSD, "Grand Central Dispatch (GCD) on FreeBSD", May 2011, pp. 1-3, available at: https://wiki.freebsd.org/GCD.
Gamme, E., et al., "Design Patterns: Elements of Reusable Object-Oriented Software", Addison-Wesley Professional, Boston, MA, Oct. 1994, pp. 1-431.
Google, "Nexus One—Google Phone Gallery", May 2011, pp. 1-5, available at: http://www.google.com/phone/detail/nexus-one.
Google, "Nexus S—Google Phone Gallery", May 2011, pp. 1-2, available at: http://www.google.com/phone/detail/nexus-s.
Google, Inc. "Google Voice", Feb. 2011, pp. 1-7, available at: http://www.google.com/googlevoice/about.html.
Hamaji, S., "Mach-O Loader for Linux", Mar. 2011, pp. 1-4, available at: https://github.com/shinh/maloader.
Heily, M., "Libkqueue", Mar. 2011, pp. 1-3, available at: http://www.heily.com/~mheily/proj/libkqueue/.
Hess, R. and Paulson, P., "Linux Kernel Projects for an Undergraduate Operating Systems Course", In Proceedings of the 41st ACM Technical Symposium on Computer Science Education, New York, NY, US, Mar. 2010, pp. 485-489.
Hex-Rays, SA, "IDA About", Jan. 2014, pp. 1-2, available at: http://www.hex-rays.com/products/ida/.
Hohensee, P., et al., "Wabi CPU Emulation", In Hot Chips 8, 1996 (month unknown), pp. 1-37.
Hunt, G.C. and Brubacher D., "Detours: Binary Interception of Win32 Functions", In Proceedings of the 3rd USENIX Windows NT Symposium, Seattle, WA, US, Jul. 1999, pp. 1-9.
Hwang, J., et al., "Xen on ARM: System Virtualization using Xen Hypervisor for ARM-Based Secure Mobile Phones", In Proceedings of the 5th Consumer Communications and Network Conference, Las Vegas, NV, US, Jan. 2008, pp. 1-5.
I. Printing Communications Assoc., "NDIS Developer's Reference", last accessed Jul. 24, 2013, pp. 1-2, available at: http://www.ndis.com/.
Imagination Technologies Ltd., "PowerVR Series 5 SGX Architecture Guide for Developers", Nov. 2011, pp. 1-10.
International Search Report dated Sep. 19, 2014 in International Patent Application No. PCT/US2014/034825.
Juliano, J., et al., "EGL_KHR_image_base", Jun. 2013, pp. 1-13, available at: http://www.khronos.org/registry/egl/extensions/KHR/EGL_KHR_image_base.txt.
Khronos Group, "Khronos Native Platform Graphics Interface (EGL Version 1.4)", Feb. 2013, pp. 1-87, available at: http://www.khronos.org/registry/egl/specs/eglspec.1.4.20130211.pdf.
Khronos Group, "OpenGL Common Profile Specification Version 2.0.25 (Full Specification)", Nov. 2010, pp. 1-204, available at: http://www.khronos.org/registry/gles/specs/2.0/es_full_spec_2.0.25.pdf.
Khronos Group, "OpenGL ES—The Standard for Embedded Accelerated 3D Graphics", Jan. 2013, pp. 1-4, available at: http://www.khronos.org/opengles/.
Khronos Group, "OpenGL Extensions—OpenGL.org", Apr. 2015, pp. 1-8, available at: http://www.opengl.org/wiki/OpenGL_Extensions.
Kim, J.H. and Lee, Y.S., "A Study on the iOS-to-Android Converter using a Resource Converter and a Platform Mapping Engine", In International Journal of Software Engineering and its Applications, vol. 8, No. 1, Feb. 2014, pp. 427-440.
Kiszka, J., et al., "SourceForge.net:ndiswrapper", last accessed Jul. 23, 2013, pp. 1-2, available at: http://ndiswrapper.sourceforge.net/.
Kolyshkin, K., "Recent Advances in the Linux Kernel Resource Management", 2011 (month unknown), pp. 1-19, available at: http://www.cse.wustl.edu/~lu/control-tutorials/im09/slides/virtualization.pdf.
Laadan, O., et al, "Teaching Operating Systems Using Virtual Appliances and Distributed Version Control", In Proceedings of the 41st ACM Technical Symposium on Computer Science Education, Mar. 2010, pp. 480-484.
Laadan, O., et al., "A Personal Virtual Computer Recorder", In Proceedings of the 21st Symposium on Operating Systems Principles, Stevenson WA, US, Oct. 2007, pp. 1-343.
Laadan, O., et al., "Structured Linux Kernel Projects for Teaching Operating System Concepts", In Proceedings of the 42nd ACM Technical Symposium on Computer Science Education, Mar. 2011, pp. 287-292.
Lagar-Cavilla, H.A., et al., "Vmm-independent graphics acceleration", In Proceedings of the 3rd International Conference on Virtual Execution Environments, New York, NY, US, Jun. 2007, pp. 33-43.
Lampsom, B. W., "Hints for Computer System Design", In SIGOPS Operating Systems Review, Oct. 1983, pp. 33-48.
Lawson, B., et al., "Using iPodLinux in an Introductory OS Course", In Proceedings of the 39th ACM Technical Symposium on Computer Science Education, New York, NY, US, Mar. 2008, pp. 182-186.
Liu, H., et al., "BabyOS: A Fresh Start", In Proceedings of the 38th ACM Technical Symposium on Computer Science Education, New York, NY, US, Mar. 2007, pp. 566-570.
Liu, J., et al., "High Performance VMM-bypass I/O in Virtual Machines", In Proceedings of the 2006 USENIX Annual Technical Conference, Boston MA, US, Jun. 2006, pp. 1-35.
LXC Linux Containers, "Main Page", Nov. 2014, pp. 1-2, available at: http://linuxcontainers.org/.

(56) References Cited

OTHER PUBLICATIONS

Mekentosj B.V., "Papers", Oct. 2013, pp. 1-2, available at: http://itunes.apple.com/us/app/papers/id304655618, Oct. 2013.
Microsoft, "About the Wireless Hosted Network", 2011 (month unknown), pp. 1, available at: http://msdn.microsoft.com/en-us/library/dd815234(v=vs.85).aspx.
MLBA Team, "XDispatch—Overview", Jan. 2013, pp. 1-2, available at: http://opensource.mlba-team.de/xdispatch/docs/current/index.html
Mobile Systems, "Office Suite Pro (Trial)", Android Market, 2011 (month unknown), pp. 1-3, available at: http://market.android.com/details?id=com.mobisystems.editor.office_with_reg.
Munshi, A. and Leech, J. "OpenGL ES Common Profile Specification Version 2.0.25 (Full Specification)", Nov. 2010, pp. 1-204, available at: https://www.khronos.org/registry/gles/specs/2.0/es_full_spec_2.0.25.pdf.
Nieh, J. and Vaill, C., "Experiences Teaching Operating Systems Using Virtual Platforms and Linux", In Proceedings of the 36th ACM Technical Symposium on Computer Science Education, New York, NY, US, Feb. 2005, pp. 520-524.
NVIDIA Corporation, "NVIDIA SLI MultiOS", Feb. 2011, pp. 1-3, available at: http://www.nvidia.com/object/sli-multi-os.html.
Okajima, J.R., "AUFS", 2011 (month unknown), pp. 1-25, available at: http://aufs.sourceforge.net/aufs2/man.html.
Open Kernel Labs, "OKL4 Microvisor", Mar. 2011, pp. 1-6, available at: http://www.ok-labs.com/products/ok14-microvisor, last accessed Sep. 10, 2011.
OpenIntents, "SensorSimulator—openintents—Sensor Simulator for simulating sensor data in real time", Google Project Hosting, Jan. 2013, pp. 1-20, available at: http://code.google.com/p/openintents/wiki/SensorSimulator.
OpenVZ, "Main Page", May 2015, pp. 1-3, available at: http://openvs.org/Main_Page.
Oracle Corporation, "Consolidating Applications with Oracle Solaris Containers", Jul. 2011, pp. 1-48, available at: http://www.oracle.com/technetwork/server-storage/solaris/documentation/consolidating-apps-163572.pdf.
Oracle Corporation, "System Administration Guide: Oracle Solaris Containers—Resource Management and Oracle Solaris Zones", Sep. 2010, pp. 1-500, available at: http://docs.oracle.com/cd/E19253-01/817-1592/817-1592.pdf.
Oracle Corporation, "Transitioning from Oracle Solaris 10 to Oracle Solaris", Mar. 2012, pp. 1-140, available at: http://docs.oracle.com/cd/E23824_01/pdf/E24456.pdf.
Osman, S., et al., "The Design and Implementation of Zap: A System for Migrating Computing Environments", In Proceedings of the 5th Symposium on Operating Systems Design and Implementation, Boston, MA, US, Dec. 2002, pp. 1-16.
Parallels IP Holdings GMBH, "Parallels Desktop", last accessed Mar. 22, 2013, pp. 1, available at: http://www.parallels.com/products/desktop/.
PassMark Software, Inc., "Passmark Performancetest—Android Apps on Google Play", Jan. 2013, pp. 1-2, available at: https://play.google.com/store/apps/details?id=com.passmark.pt_mobile.
PassMark Software, Inc., "PerformanceTest Mobile on the App Store on iTunes", Jun. 2012, pp. 1-2, available at: https://itunes.apple.com/us/app/performancetest-mobile/id494438360.
Pfaff, B., et al., "The Pintos Instructional Operating System Kernel", In Proceedings of the 40th ACM Technical Symposium on Computer Science Education, New York, NY, US, Mar. 2009, pp. 453-457.
PhoneGap, "PhoneGap-Home", last accessed Jul. 23, 2013, pp. 1-4, available at: http://phonegap.com/.
Pizlo, F., "Surfin' Safari—Blog Archive—Introducing the WebKit FTL JIT", May 2014, pp. 1-12, available at: https://www.webkit.org/blog/3362/introducing-the-webkit-ftl-jit/.
Polarbit, "Reckless Racing", Android Market, 2011 (month unknown), pp. 1-3, available at: http://market.android.com/details?id=com.polarbit.RecklessRacing.
Porter, D.E., et al, "Rethinking the Library OS From the Top Down", in Proceedings of the 16th International Conference on Architectural Support for Programming Languages and Operating Systems, Mar. 2011, pp. 291-304.
Puder, A. and Antebi, O., "Cross-Compiling Android Applications to iOS and Windows Phone 7", In Mobile Networks and Applications, vol. 18, No. 1, Feb. 2013, pp. 3-21.
Rashid, R., et al., "Machine-Indpendent Virtual Memory Management for Paged Uniprocessor and Multiprocessor Architectures", In ACM SIGOPS Operating Systems Review, vol. 21, No. 4, Oct. 1987, pp. 31-39.
Ratanaworabhan, P., et al, "Comparing the Behavior of Javascript Benchmarks with Real Web Applications", In Proceedings of the 2010 USENIX Conference on Web Application Development, Berkeley, CA, US, 2010 (month unknown), pp. 1-12.
Red Bend Software, "VLX Mobile Virtualization", 2011 (month unknown), pp. 1-3, available at: http://www.redbend.com.
Rejetto, "HFS ~ HTTP file Server", 2011 (month unknown), pp. 1, available at: http://www.rejetto.com/hfs.
Rosasco J. and Barnes A., "GL_APPLE_row_bytes", Oct. 2006, pp. 1-6, available at: http://www.opengl.org/registry/specs/APPLE/row_bytes.txt.
Rovio Mobile Ltd., "Angry Birds—Android Market", 2011 (month unknown), pp. 1-3, available at: https://market.android.com/details?id=com.rovio.angrybirds.
Shankland, S., et al., "The Brains behind Apple's Rosetta", CNET News, Jun. 2005, pp. 1-4, available at: http://news.cnet.com/The-brains-behind-Apples-Rosetta-Transitive/2100-1016_3-5736190.html.
Spitzer, J., et al., "GL_NV_fence", Dec. 2008, pp. 1-9, available at: http://www.khronos.org/registry/gles/extensions/NV/fence.txt.
Stahl, G., "GL_APPLE_fence", Aug. 2002, pp. 1-6, available at : https://www.opengl.org/registry/specs/APPLE/fence.txt.
Stegmaier, S., et al., "A Generic Solution for Hardware-Accelerated Remote Visualization", In Proceedings of the Symposium on Data Visualization, Aire-la-ville, CH, May 2002, pp. 1-9.
Su, G., "MOVE: Mobility with Persistent Network Connections", PhD thesis, Columbia University, Oct. 2004, pp. 1-261.
Sugerman, J., et al., "Virtualizing I/O Devices on VMware Workstation's Hosted Virtual Machine Monitor", In Proceedings of the 2001 USENIX Annual Technical Conference, Boston MA, US, Jun. 2001, pp. 1-15.
Tanenbaum, A.S., "A UNIX Clone with Source Code for Operating Systems Courses", In SIGOPS Operating Systems Reveiw, Jan. 1987, pp. 20-29.
The Android OpenSource Project, "Dashboards—Android Developers", Apr. 2014, pp. 1-5, available at: http://developer.android.com/about/dashboards/index.html.
The VirtualGL Project, "VirtualGL—Main/TheVirtualGL Project", May 2014, pp. 1-7, available at: https://www.virtualgl.org/.
Tian, K., "Graphics Virtualization (XenGT)", 2014 (month unknown), pp. 1-5, available at: http://01.org/xen/blogs/srclarkx/2013/graphics-virtualization-xengt.
Torus Knot Software, Ltd., "OGRE—Open Source 3D Graphics Engine", May 2014, pp. 1-3, available at: https://ogre3d.org/.
Tung, C.K., "CK's IT Blog: How to Decrypt iPhone IPA File", Feb. 2009, pp. 1-10, available at: http://tungchingkai.blogspot.com/2009/02/how-to-decrypt-iphone-ipa-file.html.
U.S. Appl. No. 61/814,160, filed Apr. 19, 2013.
VMware, Inc. "VMware Workstation", last accessed Mar. 22, 2013, pp. 1-9, available at: http://www.vmware.com/products/workstation/.
Waldspurger, C.A., "Memory Resource Management in VMware ESX Server", In Proceedings of the 5th Symposium on Operating Systems Design and Implementation, Boston MA, US, Dec. 2002, pp. 1-14.
Wall, L., et al., "Programming Perl", O'Reilly Media, Sebastopol CA, US, Oct. 1996, pp. 1-1107.
Web Standards Project, "The Acid3 Test", pp. X, Mar. 2008, p. 1, available at: http://www.acidtests.org.
WebKit Community, "Bug 24986—[multi-patch] ARM JIT port.", Jun. 2009, pp. 1-27, http://bugs.webkit.org/show_bug.cgi?id=24986.

(56) References Cited

OTHER PUBLICATIONS

Weintraub, S., "Industry First: Smartphones Pass PCs in Sales", In Google 24/74—Fortune Tech, Feb. 2011, pp. 1-4, available at http://tech.fortune.cnn.com/2011/02/07/idc.smartphone-shipment-number-passed-pc-in-q4-2010.

WorkLight, Inc., "WorkLight Mobile Platform", 2011 (month unknown), pp. 1-2, available at: http://worklight.com.

Woyke, E., "iPhone and Android Apps 101", Nov. 2008, pp. 1-3, available at: http://www.forbes.com/2008/11/11/mobile-apps-colleges-tech-wire-cx_ew_1111mobileapps.html.

Wright, C.P., et al., "Versatility and Unix Semantics in Namespace Unification," In ACM Transactions on Storage, Feb. 2006, pp. 74-105.

Written Opinion dated Sep. 19, 2014 in International Patent Application No. PCT/US2014/034825.

Wysocki, R. J., "An Alternative to Suspend Blockers", Nov. 2010, pp. 1-5, available at: http://lwn.net/Articles/416690/.

Wysocki, R. J., "Technical Background of the Android Suspend Blockers Controversey", Nov. 2010, pp. 1-18, available at: http://lwn.net/images/pdf/suspend_blockers.pdf.

X.Org Foundation, "GLX", Apr. 2013, , pp. 1, available at: http://dri.freedesktop.org/wiki/GLX.

Xen Project, "Architecture for Split Drivers Within Xen" 2011 (month unknown), pp. 1-5, http://wiki.xensource.com/xenwiki/XenSplitdrivers.

Yeecco, Ltd., "www.yeecco.com", last accessed Jun. 27, 2013, pp. 1-2, available at: http://www.yeecco.com/stella.

Yelp, "Yelp on the App Store on iTunes", Dec. 2013, pp. 1-3, available at: http://itunes.apple.com/us/app/yelp/id284910350.

Young, M., et al., "The Duality of Memory and Communication in the Implementation of a Multiprocessor Operating System", In Proceedings of the 11th ACM Symposium on Operating Systems Principles, Austin, TX, US, Nov. 1987, pp. 63-76.

ZDNet, "Stolen Apps that Root Android, Steal Data and Open Backdoors", Mar. 2011, pp. 1-5, available at: http://zd.net/gGUhOo.

NVIDIA Corporation, "Shared Virtual GPU (vGPU) Technology—NVIDIA", last accsesed Jun. 15, 2015, pp. 1-4, available at: http://www.nvidia.com/object/virtual-gpus.html.

NVIDIA Corporation, "High Performance Computing (HPC) and Supercomputing—NNVIDIA Tesla—NVIDIA", last accessed Jun. 15, 2015, pp. 1-3, available at: http://www.nvidia.com/object/tesla-supercomputing-solutions.html.

The Android OpenSource Project, "Graphics—Android Developers", last accessed Jun. 16, 2015, pp. 1-4, available at: http://source.android.com/devices/graphics.html.

Wikipedia, "Mobile Device", last modified Jun. 2, 2015, pp. 1-4, http://en.wikipedia.org/wiki/Handheld_device.

Ellis et al., "The Annotated C++ Reference Manual", Addison-Wesley Publishing Company, 1990, pp. 3, 91, 92, 95-97.

Office Action dated Jun. 23, 2017 in U.S. Appl. No. 14/785,614, p. 1-17.

\* cited by examiner

METHODS, SYSTEMS, AND MEDIA FOR BINARY COMPATIBLE GRAPHICS SUPPORT IN MOBILE OPERATING SYSTEMS

CROSS REFERENCE TO RELATED APPLICATIONS

This application claims the benefit of U.S. Provisional Application No. 62/001,436, filed May 21, 2014, and U.S. Provisional Application No. 62/164,264, filed May 20, 2015, which are hereby incorporated by reference herein in their entireties.

This application is related to International Application No. PCT/US2014/034825, filed Apr. 21, 2014, which claims the benefit of U.S. Provisional Application No. 61/814,160, filed Apr. 19, 2013, and U.S. Provisional Application No. 61/982,186, filed Apr. 21, 2014, which are hereby incorporated by reference herein in their entireties.

STATEMENT REGARDING FEDERALLY SPONSORED RESEARCH OR DEVELOPMENT

This invention was made with government support under Award Nos. CNS-1162447, CNS-1018355, and CNS-0905246 awarded by the National Science Foundation. The government has certain rights in the invention.

TECHNICAL FIELD

The disclosed subject matter relates to methods, systems, and media for binary compatible graphics support in mobile operating systems.

BACKGROUND

Many people use applications on their mobile devices, such as mobile phones and tablet computers, to play games, read and/or respond to emails, browse the Internet, consume media content, etc. However, these applications are often designed and created to be executed on a particular operating system (e.g., the iOS operating system, the Android operating system, etc.) associated with a particular mobile device. It can therefore be difficult to install and/or run applications created for a mobile device running one operating system on a mobile device running a different operating system. For example, mobile devices running the Android operating system cannot run gaming applications created for the iOS operating system. In another example, mobile device running the iOS operating system cannot access rich multimedia content available in Apple iTunes. This can also limit mobile device users to selecting particular mobile devices that may have smaller screen sizes or other hardware constraints.

Accordingly, it is desirable to provide new methods, systems, and media for binary compatible graphics support in mobile operating systems.

SUMMARY

In accordance with some embodiments of the disclosed subject matter, methods, systems, and media for binary compatible graphics support in mobile operating systems are provided.

In some embodiments, a method for binary compatibility is provided, the method comprising: receiving, from a foreign application, a function call having one or more arguments to a surrogate function, wherein the surrogate function is contained in a surrogate library and wherein the surrogate library corresponds to a foreign library associated with a foreign function call; identifying a domestic function corresponding to the surrogate function; executing a first block of code in the foreign library, wherein the first block of code is identified based on a portion of code in the foreign library that is replaced with the surrogate function; setting a pointer identifying memory that is local to a thread associated with the surrogate function to point to a first portion of memory associated with the domestic function; invoking the identified domestic function using the one or more arguments; storing values including one or more error codes returned from the invoked domestic function; setting the pointer to point to a second portion of memory associated with the foreign function call; executing a second block of code in the foreign library, wherein the second block of code is identified based on the portion of code in the foreign library that is replaced with the surrogate function; and continuing to execute the foreign application.

In some embodiments, the method further comprises modifying at least one of the one or more arguments prior to invoking the identified domestic function using the one or more arguments.

In some embodiments, the method further comprises: determining that at least one of the one or more arguments corresponds to a parameter that is proprietary to the foreign application; and, in response to the determination, causing the surrogate function to return a predetermined value.

In some embodiments, the method further comprises: determining that the function call corresponds to a plurality of surrogate functions; identifying a plurality of domestic functions that correspond to the plurality of surrogate functions; and invoking the plurality of identified domestic functions.

In some embodiments, the method further comprises: determining, from within a thread of the surrogate function, that a new object is to be created, wherein the new object is connected to a container of one or more objects and wherein the new object defines a particular version of an Application Programming Interface to be used with the container; causing new instances of libraries associated with the new object and with the particular version of the Application Programming Interface to be loaded and linked with unique virtual addresses; calling one or more constructors of the loaded and linked libraries; and storing information associated with the new object in a first portion of memory associated with the thread.

In some embodiments, the method further comprises: storing a value that associates the first portion of memory with an identity of the container; determining that a function associated with an object within the container has been called from a second thread; saving one or more values indicating a state of a second portion of memory associated with the second thread; recalling the stored value to identify the first portion of memory; replacing the second portion of memory with the first portion of memory; calling the function from within the second thread; and restoring the second portion of memory using the saved one or more values.

In some embodiments, a method for binary compatibility is provided, the method comprising: passing a graphics-related context from a first thread to a second thread, wherein the graphics-related context of the first thread is associated with a first thread local storage; extracting one or more thread local storage values from the first thread local storage; executing, from the second thread, a graphics-related function call having one or more arguments to a surrogate function within the first thread, wherein the surrogate function is contained in a surrogate library and wherein the surrogate library corresponds to a foreign graphics library associated with a foreign graphics-related function call; identifying a domestic graphics-related function corresponding to the surrogate function; setting a pointer identifying memory that is local to the second thread associated with the surrogate function to point to a second thread local storage associated with the domestic function; replacing thread local storage values in the second thread local storage with the extracted thread local storage values from the first thread local storage; invoking the identified domestic graphics-related function using the one or more arguments; storing values including one or more error codes returned from the invoked domestic function in the second thread local storage; restoring the thread local storage values in the second thread local storage with the replaced thread local storage values; and continuing to execute the second thread.

In some embodiments, a system for binary compatibility is provided, the system comprising: a hardware processor that is configured to: receive, from a foreign application, a function call having one or more arguments to a surrogate function, wherein the surrogate function is contained in a surrogate library and wherein the surrogate library corresponds to a foreign library associated with a foreign function call; identify a domestic function corresponding to the surrogate function; execute a first block of code in the foreign library, wherein the first block of code is identified based on a portion of code in the foreign library that is replaced with the surrogate function; set a pointer identifying memory that is local to a thread associated with the surrogate function to point to a first portion of memory associated with the domestic function; invoke the identified domestic function using the one or more arguments; store values including one or more error codes returned from the invoked domestic function; set the pointer to point to a second portion of memory associated with the foreign function call; execute a second block of code in the foreign library, wherein the second block of code is identified based on the portion of code in the foreign library that is replaced with the surrogate function; and continue to execute the foreign application.

In some embodiments, a system for binary compatibility is provided, the system comprising: a hardware processor that is configured to: pass a graphics-related context from a first thread to a second thread, wherein the graphics-related context of the first thread is associated with a first thread local storage; extract one or more thread local storage values from the first thread local storage; execute, from the second thread, a graphics-related function call having one or more arguments to a surrogate function within the first thread, wherein the surrogate function is contained in a surrogate library and wherein the surrogate library corresponds to a foreign graphics library associated with a foreign graphics-related function call; identify a domestic graphics-related function corresponding to the surrogate function; set a pointer identifying memory that is local to the second thread associated with the surrogate function to point to a second thread local storage associated with the domestic function; replace thread local storage values in the second thread local storage with the extracted thread local storage values from the first thread local storage; invoke the identified domestic graphics-related function using the one or more arguments; store values including one or more error codes returned from the invoked domestic function in the second thread local storage; restore the thread local storage values in the second thread local storage with the replaced thread local storage values; and continue to execute the second thread.

In some embodiments, non-transitory computer-readable media containing computer executable instructions that, when executed by a processor, cause the processor to perform a method for binary compatibility are provided, the method comprising: receiving, from a foreign application, a function call having one or more arguments to a surrogate function, wherein the surrogate function is contained in a surrogate library and wherein the surrogate library corresponds to a foreign library associated with a foreign function call; identifying a domestic function corresponding to the surrogate function; executing a first block of code in the foreign library, wherein the first block of code is identified based on a portion of code in the foreign library that is replaced with the surrogate function; setting a pointer identifying memory that is local to a thread associated with the surrogate function to point to a first portion of memory associated with the domestic function; invoking the identified domestic function using the one or more arguments; storing values including one or more error codes returned from the invoked domestic function; setting the pointer to point to a second portion of memory associated with the foreign function call; executing a second block of code in the foreign library, wherein the second block of code is identified based on the portion of code in the foreign library that is replaced with the surrogate function; and continuing to execute the foreign application.

In some embodiments, non-transitory computer-readable media containing computer executable instructions that, when executed by a processor, cause the processor to perform a method for binary compatibility are provided, the method comprising: passing a graphics-related context from a first thread to a second thread, wherein the graphics-related context of the first thread is associated with a first thread local storage; extracting one or more thread local storage values from the first thread local storage; executing, from the second thread, a graphics-related function call having one or more arguments to a surrogate function within the first thread, wherein the surrogate function is contained in a surrogate library and wherein the surrogate library corresponds to a foreign graphics library associated with a foreign graphics-related function call; identifying a domestic graphics-related function corresponding to the surrogate function; setting a pointer identifying memory that is local to the second thread associated with the surrogate function to point to a second thread local storage associated with the domestic function; replacing thread local storage values in the second thread local storage with the extracted thread local storage values from the first thread local storage; invoking the identified domestic graphics-related function using the one or more arguments; storing values including one or more error codes returned from the invoked domestic function in the second thread local storage; restoring the thread local storage values in the second thread local storage with the replaced thread local storage values; and continuing to execute the second thread.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
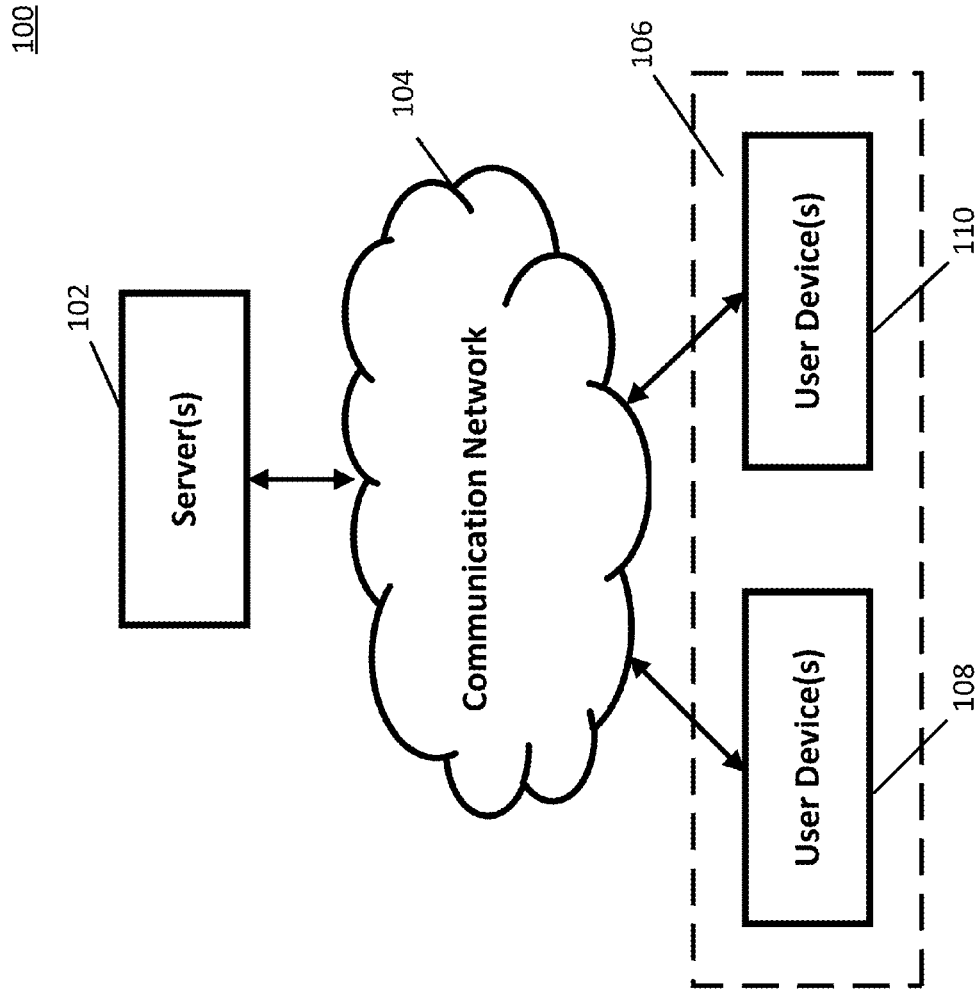
FIG. 1 shows a schematic diagram of an illustrative system suitable for implementation of mechanisms described herein for binary compatibility in accordance with some embodiments of the disclosed subject matter.

In accordance with various embodiments, mechanisms (which can include methods, systems, and media) for binary compatible graphics support in mobile operating systems are provided.

In accordance with some embodiments, the mechanisms described herein can allow foreign binaries associated with a foreign application to run on a user device using a domestic operating system. More particularly, the mechanisms described herein can allow a foreign binary that has been developed for a foreign operating system different than the domestic operating system executing on a mobile device to execute on the mobile device, which has both the domestic and the foreign operating systems. As described herein, a foreign binary refers to a binary file (e.g., a completely functional program, as opposed to source code, or a portion of source code) developed for a foreign operating system, that is, an operating system other than the operating system executing on the user device. Additionally, as used herein, a domestic binary refers to a binary file developed for a domestic operating system, that is, the operating system executing on the user device.

In some embodiments, the mechanisms described herein can provide compatibility between the foreign operating system and the domestic operating system by modifying a kernel associated with the domestic operating system. For example, the mechanisms can modify a domestic kernel by allowing the domestic kernel to be aware of both foreign and domestic threads executing on the domestic system. As a more particular example, the mechanisms can define a persona as an execution mode that is assigned to a thread, which can indicate whether the thread is associated with foreign or domestic code. As another more particular example, the mechanisms described herein can receive a foreign system call, map the foreign system call to a domestic system call (e.g., by translating calling conventions associated with the foreign system call to those associated with the corresponding domestic system call), and invoke the remapped system call.

In some embodiments, the mechanisms described herein can allow foreign source code to be directly compiled into the kernel associated with the domestic system, thereby allowing the resulting foreign binaries to use kernel services that were not originally present in the kernel of the domestic system. For example, the mechanisms can include a compile-time code adaptation layer that allows unmodified foreign kernel code to be directly compiled into the kernel of the domestic system.

Additionally or alternatively, in some embodiments, the mechanisms described herein can allow a function call from a foreign application to use domestic libraries and/or domestic function calls by creating a surrogate wrapper function for the foreign function call, which can then invoke the domestic function call. In this manner, the mechanisms described herein can remap foreign function calls which access proprietary software and/or hardware associated with the foreign system to domestic function calls which interface with software and/or hardware associated with the user device.

Turning to FIG. 1, an example 100 of hardware for binary compatibility that can be used in accordance with some embodiments of the disclosed subject matter is shown. As illustrated, hardware 100 can include one or more servers 102, a communication network 104, and one or more user devices 106, such as user devices 108 and 110.

Server(s) 102 can be any suitable servers for providing access to the mechanisms described herein for enacting foreign functions calls, such as a processor, a computer, a data processing device, or any suitable combination of such devices. For example, in some embodiments, server(s) 102 can transmit mobile device applications to a user device, for example, via communication network 104. As another example, in some embodiments, server(s) 102 can generate surrogate libraries used to allow a foreign application running on a domestic system to call domestic functions, and/or transmit the surrogate libraries to user device 106 via communication network 104.

Communication network 104 can be any suitable combination of one or more wired and/or wireless networks in some embodiments. For example, communication network 206 can include any one or more of the Internet, an intranet, a wide-area network (WAN), a local-area network (LAN), a wireless network, a digital subscriber line (DSL) network, a frame relay network, an asynchronous transfer mode (ATM)

network, a virtual private network (VPN), and/or any other suitable communication network. User devices 106 can be connected by one or more communications links to communication network 104 that can be linked via one or more communications links to server(s) 102. The communications links can be any communications links suitable for communicating data among user devices 106 and server(s) 102, such as network links, dial-up links, wireless links, hardwired links, any other suitable communications links, or any suitable combination of such links.

User devices 106 can include any one or more user devices suitable for running foreign and/or domestic applications and for implementing the mechanisms described herein for binary compatibility. For example, in some embodiments, user devices 106 can be implemented as a mobile device, such as a mobile phone, a tablet computer, a laptop computer, a vehicle (e.g., a car, a boat, an airplane, or any other suitable vehicle) entertainment system, a portable media player, and/or any other suitable mobile device. As another example, in some embodiments, user devices 106 can be implemented as a non-mobile device such as a desktop computer, a set-top box, a television, a streaming media player, a game console, and/or any other suitable non-mobile device.

Although two user devices 108 and 110 are shown in FIG. 1 to avoid over-complicating the figure, any suitable number of user devices, and/or any suitable types of user devices, can be used in some embodiments.

Figure 2:
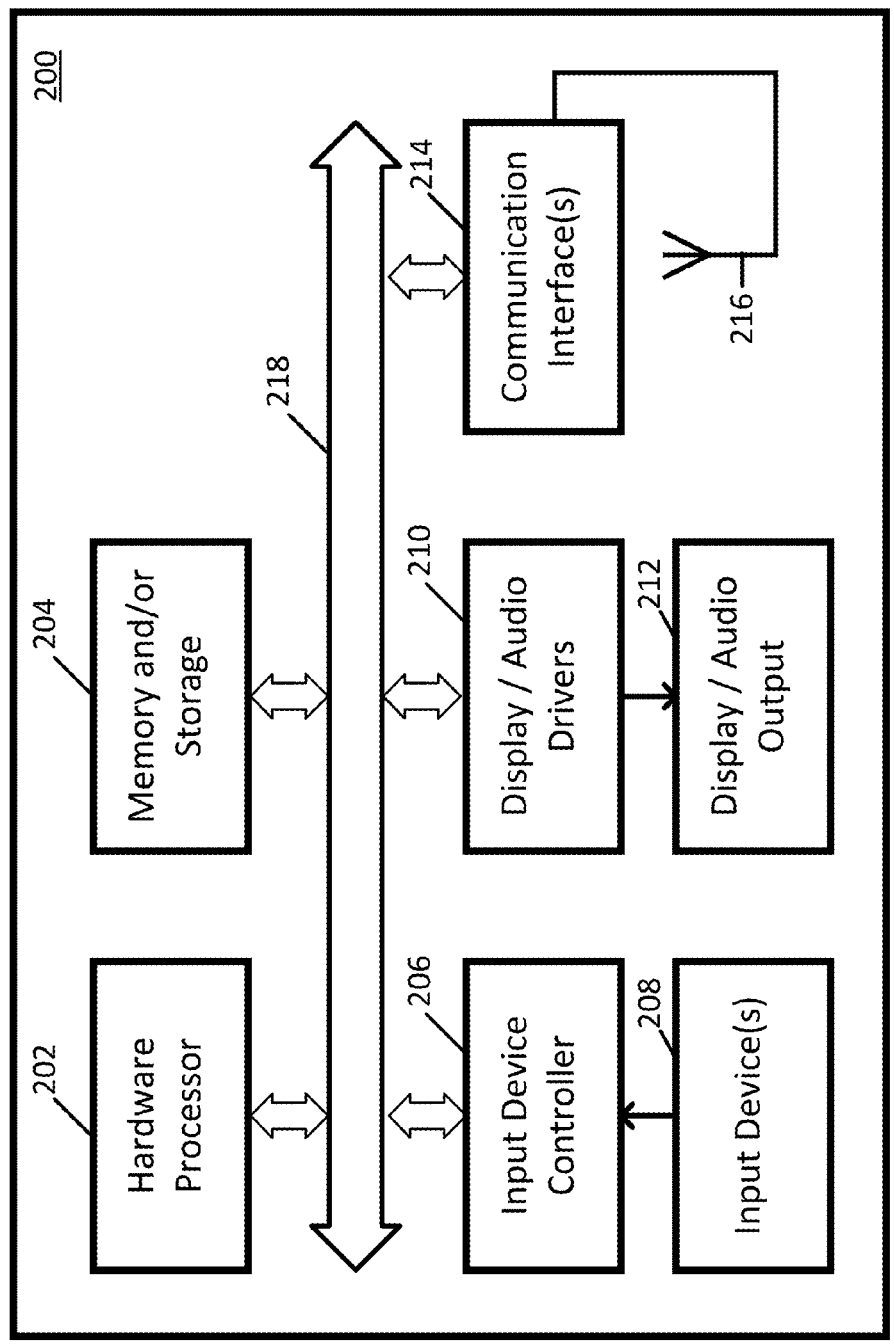
FIG. 2 shows a detailed example of hardware that can be used in a server and/or a user device of FIG. 1 in accordance with some embodiments of the disclosed subject matter.

Server(s) 102 and user devices 106 can be implemented using any suitable hardware in some embodiments. For example, in some embodiments, devices 102 and 106 can be implemented using any suitable general purpose computer or special purpose computer. For example, a mobile phone may be implemented using a special purpose computer. Any such general purpose computer or special purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general purpose computer or a special purpose computer in some embodiments.

Memory and/or storage 204 can be any suitable memory and/or storage for storing programs, data, media content, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from one or more input devices 208 in some embodiments. For example, input device controller 206 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output devices 212 in some embodiments. For example, display/audio drivers 210 can be circuitry for driving a touchscreen, a flat-panel display, a cathode ray tube display, a projector, a speaker or speakers, and/or any other suitable display and/or presentation devices.

Communication interface(s) 214 can be any suitable circuitry for interfacing with one or more communication networks, such as network 104 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network (e.g., communication network 104) in some embodiments. In some embodiments, antenna 216 can be omitted.

Bus 218 can be any suitable mechanism for communicating between two or more components 202, 204, 206, 210, and 214 in some embodiments.

Any other suitable components can be included in hardware 200 in accordance with some embodiments.

Figure 3:
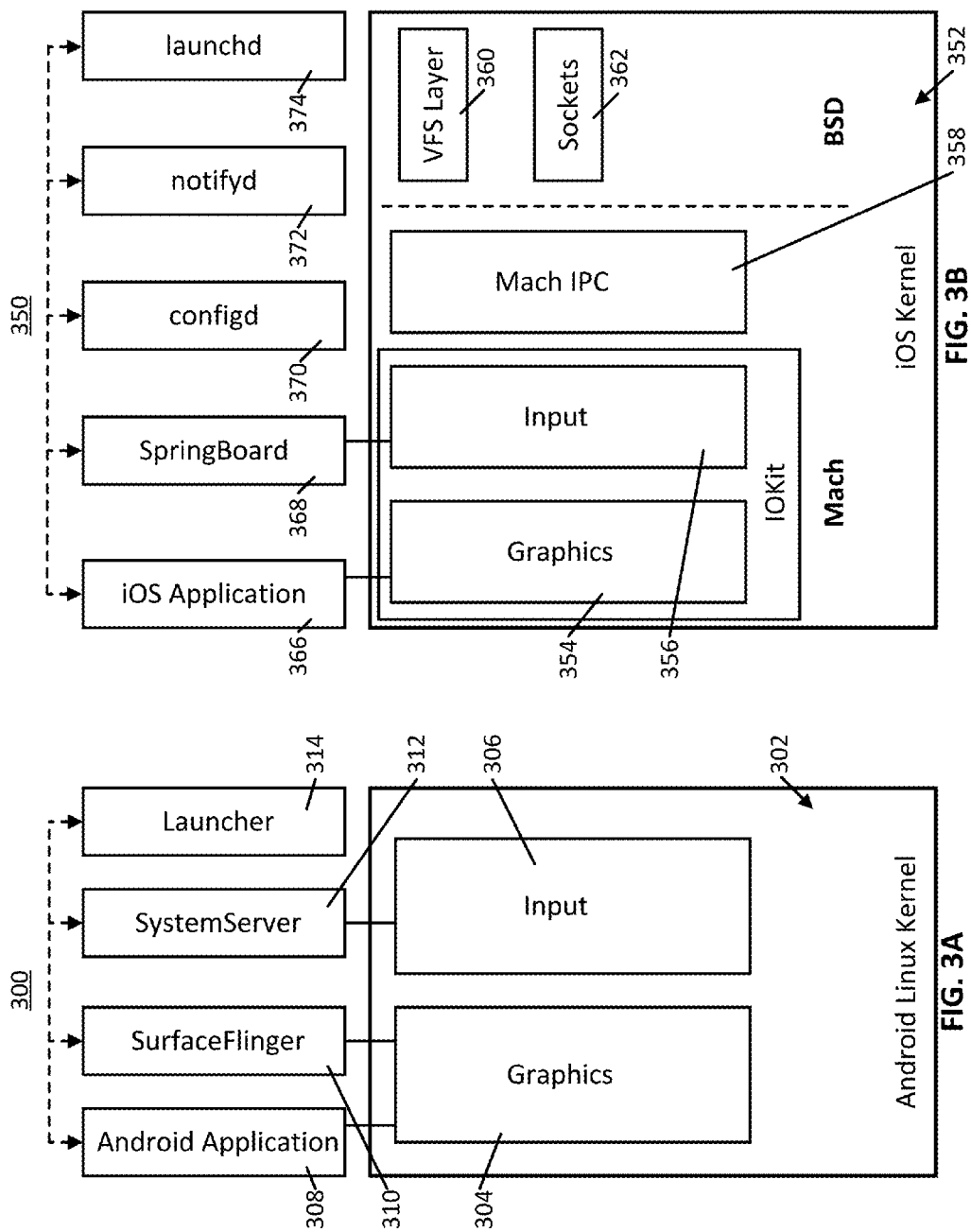
FIGS. 3A and 3B show examples of architectures of an Android system and an iOS system, respectively, in accordance with some embodiments of the disclosed subject matter.

In some embodiments, hardware 200 can be used in an architecture corresponding to a particular operating system. For example, FIGS. 3A and 3B show examples of architectures of an Android system (FIG. 3A) and of an iOS system (FIG. 3B), respectively.

As shown in FIG. 3A, Android architecture 300 can include an Android Linux kernel 302, an Android application 308, and one or more support libraries, such as SurfaceFlinger library 310, SystemServer library 312, and Launcher application 314.

Android Linux kernel 302 can be any suitable kernel on which the Android system is built, and can include any suitable releases. As shown in FIG. 3A, Android Linux kernel 302 can include a graphics module 304 and an input module 306. In some embodiments, graphics module 304 and input module 306 can be used to communicate with and receive communication from a user of a user device 106 that is running the Android system. For example, in some embodiments, graphics module 304 can cause one or more icons representing applications to be presented on a display output (e.g., a touchscreen, a monitor, and/or any other suitable display output) of user device 106. As another example, in some embodiments, graphics module 304 can cause graphics (e.g., images, icons, animations, movies, and/or any other suitable graphics) to be presented on the display output of user device 106. In some embodiments, graphics module 304 can include a Graphics Processing Unit (GPU). As yet another example, in some embodiments, input module 306 can be used to receive inputs from a user (e.g., taps and/or swipes on a touchscreen, clicks, and/or any other suitable inputs).

Android application 308 can be any application created for the Android system. Android application 308 can have any suitable purpose. For example, in some embodiments, Android application 308 can be an e-mail application, a media player, a game, an application which calculates and presents directions in response to a request, and/or any other suitable application. In some embodiments, Android application 308 can be created by and/or provided by any suitable entity (e.g., an individual person, a group of people, a corporation, and/or any other suitable entity). Note that although only one Android application is shown in FIG. 3A, in some embodiments, any suitable number of Android applications can be included (e.g., one, two, five, ten, and/or any other suitable number), each of which can be in a different activity state (e.g., running in an active mode, running in a background mode, and/or any other suitable activity state).

In some embodiments, SurfaceFlinger library 310, SystemServer library 312, and Launcher application 314 can be used to provide application services, graphics, input, and/or any other suitable functions. For example, in some embodiments, SystemServer library 312 can cause Launcher application 314 to be called and/or executed, thereby causing a homescreen of user device 106 to be initiated. As another example, in some embodiments, SurfaceFlinger library 310 can cause one or more display interfaces (e.g., icons, widgets, and/or any other suitable display interfaces) to be presented on a display output of user device 106 using a GPU in graphics module 304. As yet another example, SurfaceFlinger library 310 can allow Android application 308 to render graphics by providing Android application 308 with window memory in the form of a display surface. Android application 308 can then draw directly into the window memory, for example, by causing OpenGL code to be rendered using a GPU in graphics module 304. Note that although three support libraries and/or applications (e.g., libraries 310 and 312, and application 314) are shown in FIG. 3A, these are merely illustrative. In some embodiments, any suitable number of support libraries and/or applications (e.g., one, two, five, ten, and/or any other suitable number) providing any suitable functions can be included.

Turning to FIG. 3B, an example 350 of an iOS architecture is illustrated in accordance with some embodiments. As shown, iOS architecture 350 can include an iOS kernel 352, an iOS application 366, a SpringBoard application 368, and user space daemons, such as launchd daemon 374, configd daemon 370, and notifyd daemon 372.

In some embodiments, iOS kernel 352 can be any suitable kernel on which the iOS system is built (e.g., the XNU kernel), and can include any suitable releases. As shown in FIG. 3B, iOS kernel 352 can include a graphics module 354 and an input module 356. In some embodiments, graphics module 354 and input module 356 can be used to communicate with and receive communication from a user of a user device 106 running the iOS system. Similarly to graphics module 304 and input module 306 of the Android system, graphics module 354 can cause any suitable graphics (e.g., icons, animations, images, and/or any other suitable graphics) to be presented on user device 106, and input module 356 can receive any suitable input from user device 106.

In some embodiments, iOS kernel 352 can be built on the XNU kernel, which is a hybrid kernel architecture based on features of a monolithic kernel architecture, such as a monolithic Berkeley Standard Distribution (BSD) kernel, and a microkernel architecture, such as a Mach microkernel, running in a single address space. In some embodiments, iOS kernel 352 can include Mach IPC module 358, which can be used to provide inter-process communication (IPC) services between programs and/or processes running on the iOS system. Additionally, in some embodiments, iOS kernel 352 can include VFS layer 360 and/or BSD sockets 362. In some such embodiments, VFS layer 360 can be used to provide an abstraction layer to an iOS file system, and BSD sockets 362 can be used to provide additional IPC services between programs and/or processes.

In some embodiments, SpringBoard application 368 can be used to display a homescreen for the iOS system on user device 106, which can present icons, widgets, and/or any other suitable items.

In some embodiments, SpringBoard application 368 can be launched and/or started from launchd daemon 374. In some such embodiments, launchd daemon 374 can boot the iOS system, and can start, stop, and/or maintain services and applications. In addition to starting SpringBoard application 368, in some embodiments, launchd daemon 374 can start services associated with Mach IPC module 358, such as configd daemon 370 and notifyd daemon 372, which is an asynchronous notification server. Note that although only four support applications and/or services (SpringBoard application 368, configd daemon 370, notifyd daemon 372, and launchd daemon 374) are shown in FIG. 3B, these are merely illustrative. Any suitable support applications and/or services can be included in some embodiments.

Figure 4:
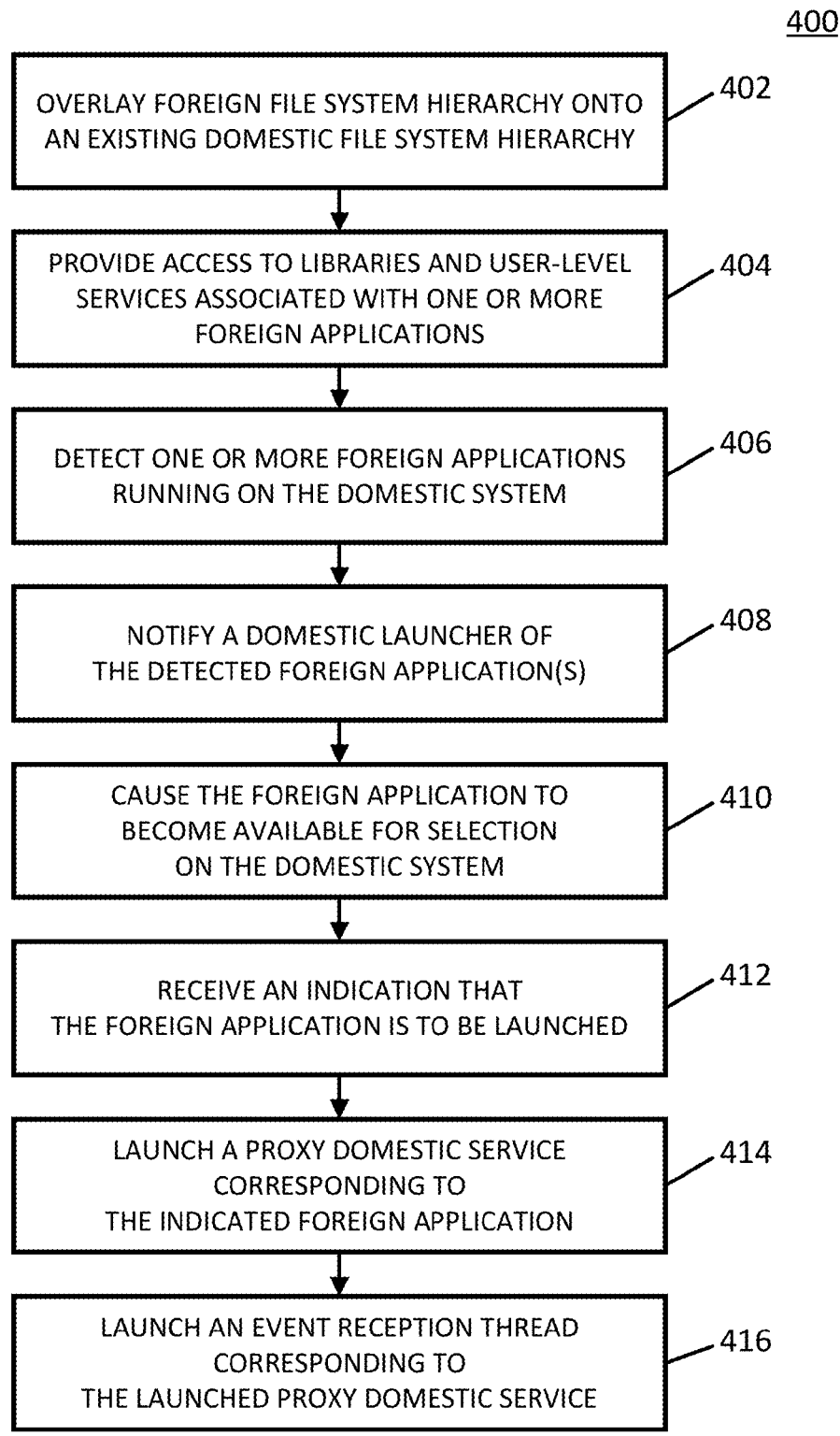
FIG. 4 shows an example of a process for providing binary compatibility between a foreign system and a domestic system in accordance with some embodiments of the disclosed subject matter.

Turning to FIG. 4, an example 400 of a process for running a foreign application on a domestic operating system is illustrated in accordance with some embodiments. In some embodiments, process 400 can be executed on any suitable user device 106. Note that, in some embodiments, the domestic operating system can include any operating system (e.g., an Android operating system, an iOS operating system, and/or any other suitable operating system) implemented on a user device executing process 400. Similarly, in some embodiments, the foreign application can be created for any foreign operating system which is different from the domestic operating system.

Process 400 can begin by placing a foreign file system hierarchy associated with the foreign operating system onto a domestic file system hierarchy associated with the domestic operating system at 402. By overlaying the foreign file system hierarchy onto the domestic file system hierarchy, the foreign operating system can access files using existing paths known to the foreign operating system, while allowing domestic applications to function without interruption. Additionally, existing paths can be accessed without running a kernel associated with the foreign operating system and without running foreign applications which are used for displaying the homescreen on the foreign system (e.g., SpringBoard application 368). The foreign file system hierarchy can be overlaid onto the domestic file system hierarchy in any suitable manner. For example, in some embodiments, process 400 can create file system entries corresponding to the foreign operating system within the file system corresponding to the domestic operating system. As a more particular example, in some embodiments, process 400 can create subdirectories (e.g., "/Applications," "/Documents," "/Library," "/System/Library," and/or any other suitable subdirectories) used for running foreign applications in the file system of the domestic operating system. In some embodiments, a view of a file system can be changed by using personas to switch between the foreign file system and the domestic file system using any suitable technique (e.g., a "chroot" operation that changes the root directory, file system unioning, and/or any other suitable technique).

Process 400 can provide access to libraries and user-level services associated with one or more foreign applications at 404 using any suitable technique or combination of techniques. For example, in some embodiments, existing binaries from the foreign operating system can be copied to the domestic operating system. In instances where existing binaries cannot be copied from the foreign operating system to the domestic operating system, process 400 can combine binaries from the foreign operating system with binaries and/or core framework libraries from one or more other development environments (e.g., an Xcode Software Development Kit, or "SDK", and/or any other suitable development environment).

Process 400 can detect and/or identify one or more foreign applications running on the domestic operating system at 406 using any suitable technique or combination of techniques. As a more particular example, in an instance where the domestic operating system is an Android system, process 400 can detect one or more foreign applications by using a kernel subsystem or any other suitable portion of the framework to detect foreign applications (e.g., iOS applications, and/or any other suitable foreign applications) or other file system events, such as the Linux "inotify" framework.

After detecting the one or more foreign applications, process 400 can notify a domestic launcher application of the detected foreign application(s) at 408 using any suitable technique or combination of techniques. In the specific example where the domestic system is an Android system, process 400 can transmit a notification to Launcher application 314 of the detected foreign application(s).

Process 400 can cause the detected foreign application(s) to become available for selection on the homescreen of user device 106 at 410 using any suitable technique or combination of techniques. In the specific example where the domestic system is an Android system, process 400 can cause the detected foreign application(s) to become available by causing Launcher application 314 to place one or more icons corresponding to the detected foreign application(s) on the homescreen of user device 106. In some embodiments, process 400 can extract icons and/or other elements related to the foreign application from a package associated with the foreign application, and process 400 can make the extracted icon(s) and/or other elements available to Launcher application 314 for placement on the homescreen.

Process 400 can receive an indication that the foreign application is to be launched at 412. The indication can be received based on any suitable information. For example, in some embodiments, process 400 can receive an indication that an icon associated with the foreign application was selected (e.g., touched on a touchscreen, clicked with a mouse, and/or any other suitable selection input) from an input module associated with the domestic system (e.g., input module 306).

Process 400 can launch a proxy domestic service corresponding to the launched foreign application at 414. In some embodiments, the proxy domestic service can be a standard application which can run on the domestic system. In such embodiments, the proxy domestic service can behave like any other domestic application. For example, in some embodiments, the proxy domestic service can receive events similarly to other domestic applications, be listed in an activity list associated with the domestic system, and/or have any other suitable capabilities. In the specific example where the domestic system is an Android system, the proxy domestic service can be launched by Launcher application 314. Additionally or alternatively, in some embodiments, a separate and/or individual copy of the proxy domestic service can be launched for each launched foreign application.

The proxy domestic service can perform any suitable functions. For example, in some embodiments, the proxy domestic service can control execution of the foreign application, by, for example, running an associated foreign binary and integrating execution of the foreign application on the domestic system with background user-level services of the foreign system. In the specific example where the foreign application is an iOS application, the proxy domestic service can facilitate initiation of iOS binary applications by issuing Java Native Interface (JNI) calls to call the unmodified iOS "launchctl" command, which can request that launchd daemon 374 (FIG. 3) run the iOS application, thereby allowing the proxy domestic service to replicate the application launch mechanism of the foreign system. As another example, in some embodiments, the proxy domestic service can transmit associated display memory to the foreign application. In some such embodiments, display memory transmitted from the proxy domestic service can be used to present screen shots of the foreign application in an activity list displayed on the user device. As yet another example, in instances where the foreign application is an iOS application, process 400 can use Process Identification (PID) virtualization to set a perceived PID associated with launchd daemon 374 to 1, as is assumed by the iOS application.

Process 400 can launch an event reception thread associated with the launched proxy domestic service at 416. In some embodiments, the launched event reception thread can receive events from the proxy domestic service (which can, in some embodiments, receive events from a BSD socket) and can forward the received events to the foreign application. The received events can include any suitable events detected based on any suitable input. For example, in some embodiments, the events can include the foreign application becoming idle and/or going into a background mode, a display associated with the user device running the foreign application rotating, receiving user input (e.g., from a keyboard, a touchscreen, an accelerometer, a microphone, and/or any other suitable input), and/or any other suitable events. Process 400 can launch the event reception thread using any suitable technique or combination of techniques. For example, in some embodiments, process 400 can launch the event reception thread as a per-application thread at a known point in the startup procedure of the foreign application.

Through coordination between the proxy domestic service and the event reception thread, process 400 can monitor and/or respond to any received events, thereby allowing the foreign application to run on the domestic system while responding to received events.

Figure 5:
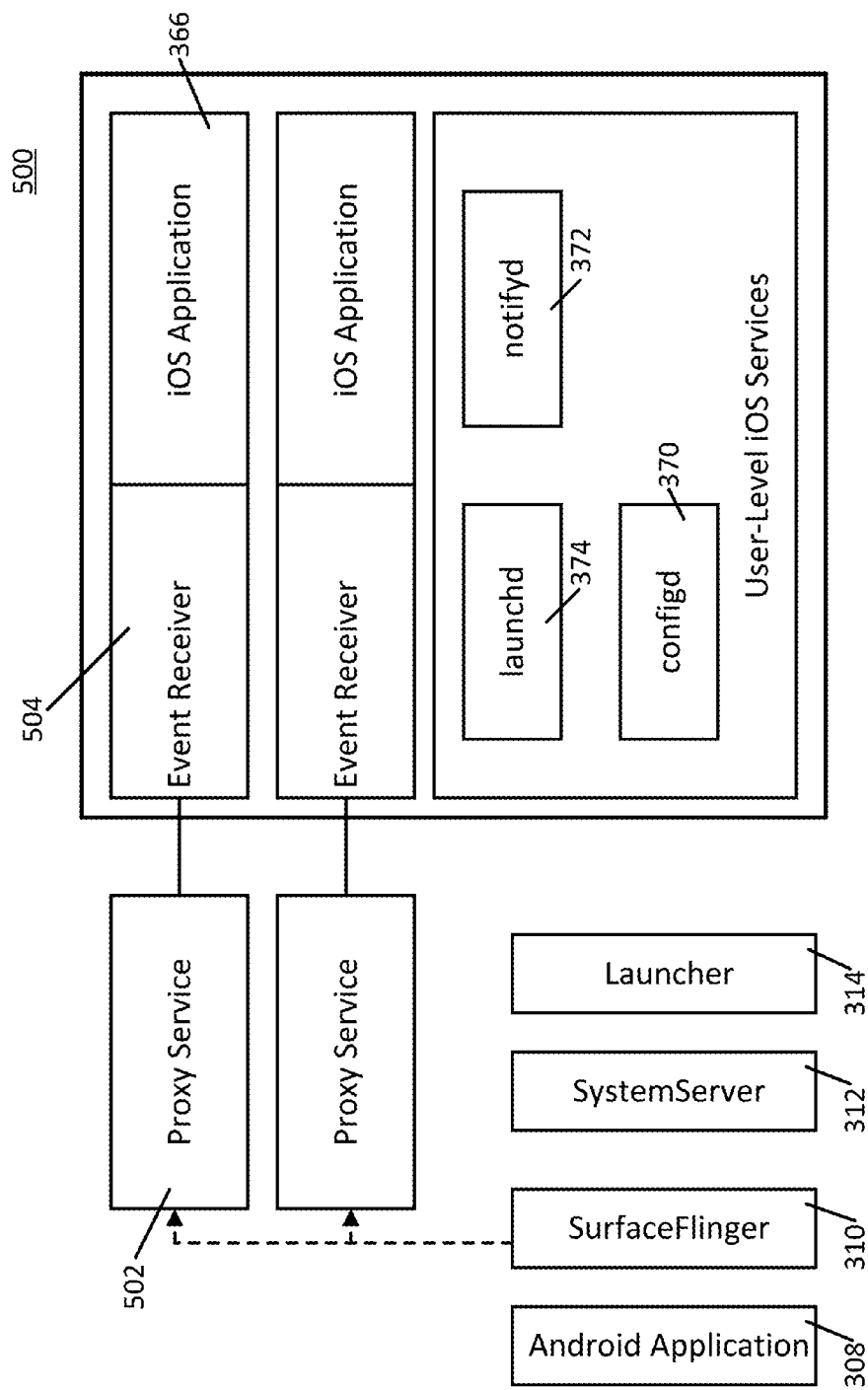
FIG. 5 shows an example of a system for integrating functionality of a foreign system with a domestic system in accordance with some embodiments of the disclosed subject matter.

Turning to FIG. 5, an example 500 of a system for integrating functionality of a foreign system with a domestic system is illustrated in accordance with some embodiments. In the specific example of system 500, the foreign system is an iOS system, and the domestic system is an Android system. As shown in FIG. 5, system 500 can include domestic support libraries and/or applications (e.g., SurfaceFlinger library 310, SystemServer library 312, and Launcher application 314) as described above in connection with FIG. 3A, user-level foreign system services (e.g., configd daemon 370, notifyd daemon, launchd daemon 374) as described above in connection with FIG. 3B, and a foreign application (e.g., iOS application 366) as described above in connection with FIG. 3B. In some embodiments, system 500 can additionally include proxy domestic services (e.g., proxy domestic service 502) and event receivers (e.g., event receiver 504).

Proxy domestic service 502 can include any suitable functions and/or processes for controlling execution of the foreign application and coordinating execution of the foreign application with domestic support libraries and/or applications (e.g., SurfaceFlinger library 310, SystemServer library 312, Launcher application 314, and/or any other suitable libraries and/or applications) as described above in connection with block 414 of FIG. 4. Although two proxy domestic services are shown in FIG. 5, this is merely illustrative. In some embodiments, any suitable number (e.g., one, two, five, ten, and/or any other suitable number) can be included.

Event receiver 504 can be any suitable event reception thread for receiving events from proxy domestic service 502 and forwarding the received events to iOS application 366, as described above in connection with block 416 of FIG. 4. Note that, in some embodiments, event receiver 504 can have a one-to-one correspondence with proxy domestic service 502, as well as a one-to-one correspondence with iOS application 366.

Figure 6:
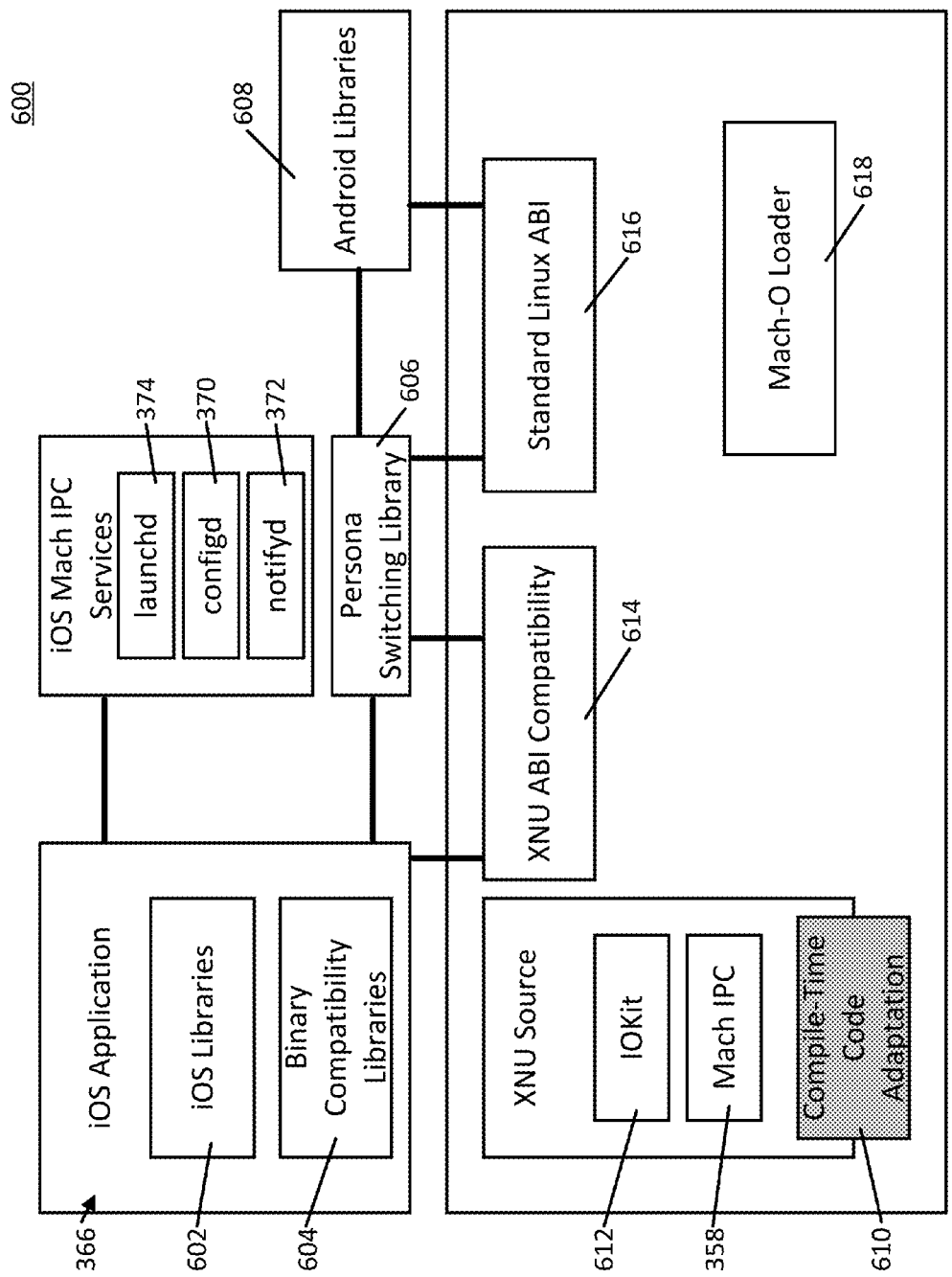
FIG. 6 shows an example of an architecture for providing binary compatibility between a foreign system and a domestic system in accordance with some embodiments of the disclosed subject matter.

Turning to FIG. 6, an example 600 of an architecture for running unmodified foreign binaries on a domestic system is illustrated in accordance with some embodiments. In the specific example of architecture 600, the foreign system is an iOS system, and the domestic system is an Android system.

In some embodiments, architecture 600 can allow code from a foreign binary to be imported into a domestic system. For example, since the iOS system is built on an open-source XNU kernel, architecture 600 can allow source code from the XNU kernel to be imported into an Android system, which can allow substantial portions of an iOS Application Binary Interface (ABI) to be implemented on the Android system. As a more particular example, in some embodiments, architecture 600 can import I/O Kit library 612, which can be used for development of device drivers for the iOS system.

Additionally or alternatively, in some embodiments, architecture 600 can run unmodified foreign binaries on the domestic system using four components (e.g., kernel ABI compatibility, API interposition, compile-time adaptation of foreign source code, and use of surrogate functions to call domestic functions from a foreign application) which provide binary compatibility between the foreign and domestic systems. Although architecture 600 illustrates the four components, in some embodiments, any of the four components can be omitted. Additionally or alternatively, in some embodiments, additional components can be included. Furthermore, in some embodiments, any suitable number of the four components can be combined to provide binary compatibility between the foreign and domestic systems.

First, in some embodiments, architecture 600 can provide compatibility between the XNU ABI and a Linux ABI on an Android system by modifying the Linux kernel ABI. For example, in some embodiments, the Linux kernel ABI can modified using XNU ABI compatibility module 614, Standard Linux ABI module 616, and Mach-O loader 618. As a more particular example, in some embodiments, Mach-O loader 618 can be used to load one or more iOS binaries on the Linux kernel. In some such embodiments, a wrapper function that maps system calls from foreign iOS binaries can be mapped to corresponding Linux system calls by first mapping arguments from XNU structures to Linux structures, then by calling corresponding Linux system calls and/or by reusing existing Linux kernel Application Programming Interfaces (APIs). An example of a process for providing kernel ABI compatibility is described below in connection with FIG. 7.

Second, in some embodiments, architecture 600 can provide an API interposition layer. In some embodiments, the API interposition layer can support system calls that can be implemented in user space using existing foreign source code in combination with Linux system calls. As a specific example, the BSD "kqueue" and "kevent" notification functions, which allow for user space to be notified of kernel events, are provided by the XNU kernel of the iOS system. Since the data semantics to register for and receive event notifications are specific to iOS subsystems, the addition of support for the "kqueue" and "kevent" functions in the Android system would require changes to many core subsystems of the Linux kernel. In some embodiments, the API interposition layer included in architecture 600 can configure an environment variable to load iOS libraries 602 (e.g., iOS libraries including functions such as "kqueue" and "kevent"), thereby allowing the foreign source code contained in iOS libraries 602 to be used on the domestic (e.g., Android) system. Additionally or alternatively, in some embodiments, API interposition can be used to launch an event receiver thread (e.g., as shown in and described above in connection with FIG. 5) by hooking into a foreign application at a known point and launching the event receiver thread at the known point.

In some embodiments, architecture 600 can combine API interposition with a mechanism (sometimes referred to herein as a "passport system call") to allow a foreign thread to access a domestic system call. In some embodiments, passport system calls can allow a thread associated with a foreign binary to indirectly call a domestic system call. For example, architecture 600 can use the API interposition layer to allow foreign kernel serves to be implemented in user space using existing domestic services via passport system calls to export the foreign API to the foreign binary. Foreign applications that require kernel-level services not available to the domestic operating system can then be executed. Note that unlike the surrogate function calls shown in and described below in connection with FIG. 9, which execute domestic user space binaries within a foreign binary (including the issuing of all domestic system calls), passport system calls can allow the issuance of specifically-identified domestic system calls from a foreign binary. In some embodiments, API interposition can be combined with passport system calls to provide foreign kernel subsystems, such as the "kqueue" and "kevent" event notification subsystems described above, foreign APIs which support prioritized workqueue threads (e.g., the iOS pthread workqueues), and/or any other suitable foreign kernel subsystems.

Third, in some embodiments, architecture 600 can include a compile-time code adaptation layer 610, which can allow unmodified binaries associated with a foreign kernel to be directly compiled into the domestic kernel, thereby allowing the foreign binaries to use kernel services not otherwise present in the domestic kernel. An example of a process for implementing compile-time code adaptation layer 610 is described below in connection with FIG. 8.

Fourth, in some embodiments, architecture 600 can include a persona switching library 606 which can allow a foreign application to use a surrogate function (e.g., a wrapper function) to call a domestic function. The persona switching library can therefore provide support for applications that use closed foreign libraries which issue system calls specific to a device running the foreign system by allowing a foreign application to use domestic libraries (e.g., Android libraries 608) to interact with hardware (e.g., a touchscreen, a keyboard, and/or any other suitable hardware) specific to a user device running the domestic system. An example of a process for allowing a foreign application to use domestic libraries is described below in connection with FIG. 9.

In some embodiments, architecture 600 can be implemented using components of hardware 200. For example, in some embodiments, files (e.g., source code, binary files, data files, and/or any other suitable file types) associated with components of architecture 600 (e.g., iOS libraries 602, binary compatibility libraries 604, persona switching library 606, Android libraries 608, compile-time adaptation layer 610, Mach-O loader 618, and/or any other suitable components) can be stored in memory 204. As another example, in some embodiments, the processes implemented by compile-time code adaptation layer 610 and/or persona switching library 606 can be executed by hardware processor 202.

Figure 7:
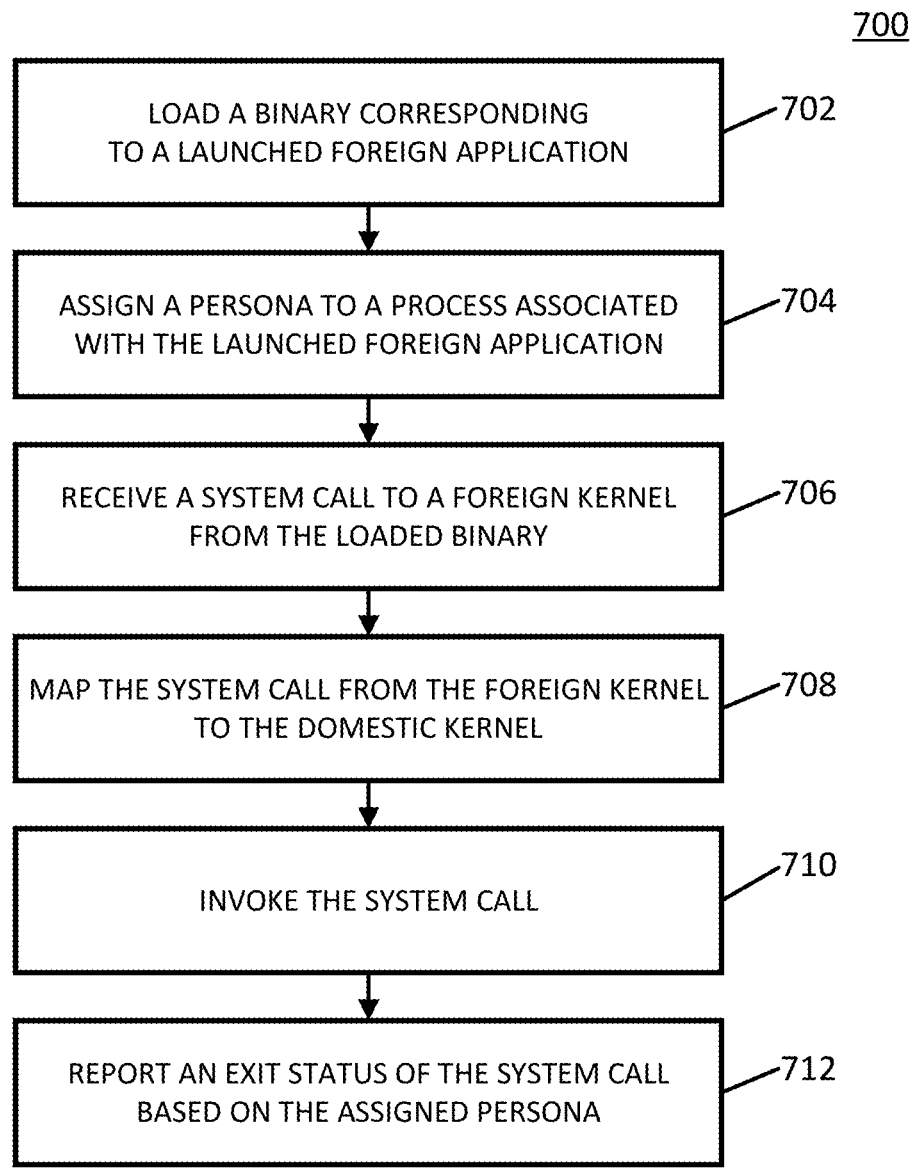
FIG. 7 shows an example of a process for providing compatibility between a foreign Application Binary Interface (ABI) and a domestic ABI in accordance with some embodiments of the disclosed subject matter.

Turning to FIG. 7, an example 700 of a process for providing compatibility between a foreign ABI and a domestic ABI is illustrated in accordance with some embodiments.

Process 700 can begin by loading a foreign binary format file corresponding to a launched foreign application at 702. The foreign binary can be loaded using any suitable technique or combination of techniques. For example, in an instance where the foreign system is an iOS system (which can use a Mach-O format for binary files) and the domestic system is an Android system, process 700 can use a Mach-O loader (e.g., Mach-O loader 618, as shown in and described above in connection with FIG. 6) to load the iOS binary file on the Linux kernel of the Android system. In some such embodiments, any suitable Mach-O loader can be used. In some embodiments, process 700 can be configured to automatically use a particular Mach-O loader upon detecting that an iOS binary is to be executed.

Process 700 can assign an indicator (referred to hereinafter as a "persona") to a thread executed by the foreign library at 704. In some embodiments, the persona can indicate any suitable information, such as whether the thread is running as a foreign or domestic thread, one or more identification numbers associated with the process and/or threads within the process, and/or any other suitable information. In some embodiments, the persona can be assigned using a system call. In the particular example where the domestic system is an Android system running on a Linux kernel, process 700 can track assigned personas on a per-thread basis using the "task_struct" function. Additionally, in some embodiments, personas can be inherited when processes are copied either partially or fully (e.g., using "fork" and/or "clone").

It should be noted that personas can be tracked on a per-thread basis, thereby allowing an application process with multiple threads to support multiple personalities.

Process 700 can receive a system call to a foreign kernel from the loaded foreign binary at 706. For example, in instances where the foreign system is an iOS system, process 700 can receive a system call specific to the XNU ABI of the iOS system. The received system call can include any suitable information and/or requests for services from the foreign binary to the kernel. In some embodiments, process 700 can determine which foreign kernel the system call is directed to based on the persona assigned at block 704.

Process 700 can map the received system call from the foreign kernel to the domestic kernel at 708. The system call can be mapped using any suitable technique or combination of techniques. For example, in some embodiments, process 700 can translate a calling convention associated with the foreign kernel to a calling convention associated with the domestic kernel. As a more particular example, in some embodiments, process 700 can evaluate the persona associated with an executing thread to determine that the thread is an iOS process, and process 700 can subsequently map the calling conventions associated with an iOS system call to the calling conventions associated with, for example, the Linux ABI of an Android system. In some embodiments, process 700 can map system calls from a convention associated with the foreign kernel to a convention associated with the domestic kernel using system call dispatch tables configured for each persona. The system call dispatch table can then be switched depending on a persona associated with the calling thread, and information such as function parameters and/or CPU flags can be translated to the convention associated with the domestic kernel using the dispatch table, thereby allowing a corresponding domestic system call to be directly invoked with the translated parameters and/or flags.

As another example, in some embodiments, process 700 can create a wrapper function for the received system call, such that the wrapper function maps the arguments of the system call from structures associated with the foreign system to structures associated with the domestic system. As a more particular example, in instances where the foreign system is an iOS system and the domestic system is an Android system, process 700 can create a wrapper function which maps arguments from XNU structures to Linux structures. Additionally or alternatively, in some embodiments, process 700 can create a wrapper function which reuses existing domestic kernel functions to implement the received foreign system call. As a more particular example, in instances where the foreign system is an iOS system and the domestic system is an Android system, and where the foreign system call is one which creates a child process from a specified process (e.g., "posix_spawn"), process 700 can create a wrapper function which uses the existing Linux system calls "clone" and "exec."

Process 700 can invoke the mapped foreign system call on the domestic system at 710. In some embodiments, the invoked system call can have any suitable arguments and any suitable number of arguments. Additionally, in some embodiments, the invoked system call can return any suitable return values.

Process 700 can report an exit status of the invoked system call at 712. In some embodiments, the exit status can be received as a signal from a domestic kernel, for example, an asynchronous signal generated in response to an event such as an illegal instruction and/or a segmentation fault. In some embodiments, process 700 can evaluate a persona of a thread (e.g., the persona assigned at block 704) associated with the invoked system call on its return path to user space, and process 700 can then report the exit status based on the determined persona. For example, some system calls to the XNU kernel return error indications through flags associated with the Central Processing Unit (CPU), whereas corresponding system calls to the Linux kernel return negative integers to indicate an error status. By evaluating a persona of a thread (e.g., to determine if the thread is running in a foreign mode or in a domestic mode), process 700 can appropriately handle the returned exit status. For example, in instances where the domestic system is an Android system and an error signal is received from a Linux kernel, process 700 can translate the received error signal into one that would have been generated by the foreign system (e.g., the XNU kernel in instances where the foreign system is an iOS system). In some embodiments, the translated error signal can then be delivered to the foreign application. In some embodiments, the exit status can include any suitable error codes (e.g., "errno," and/or any other suitable error codes).

Figure 8:
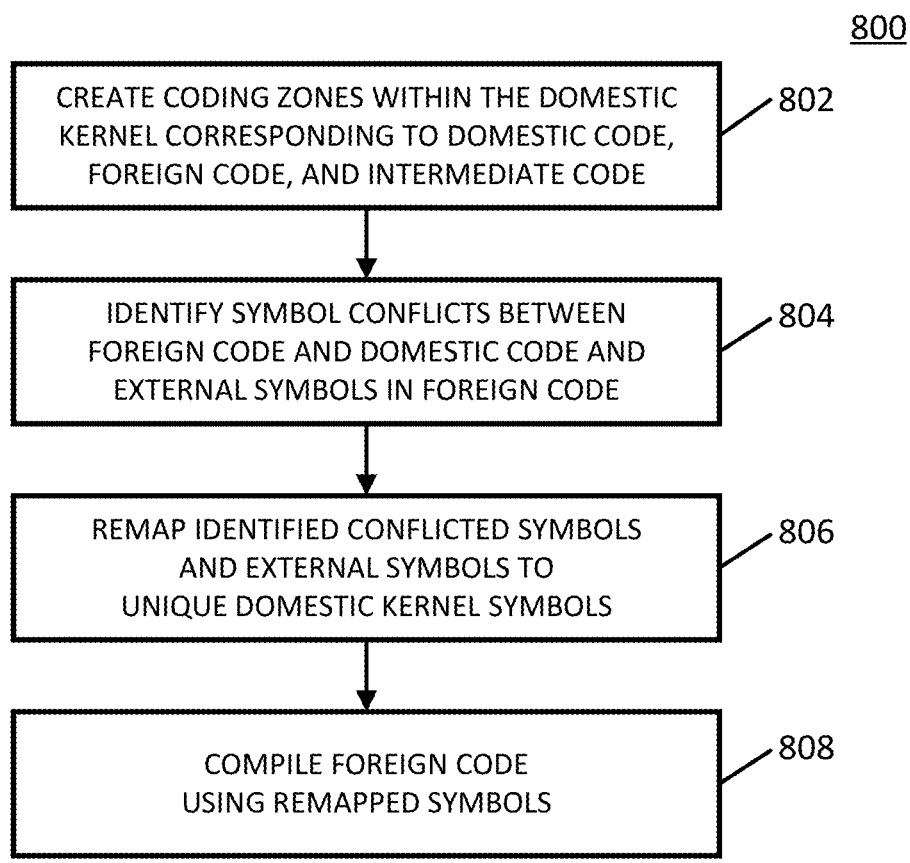
FIG. 8 shows an example of a process for providing compile-time adaptation of foreign source code in accordance with some embodiments of the disclosed subject matter.

In some embodiments, the wrapper functions described above in connection with FIG. 7 are not suitable for implementing a foreign binary. For example, foreign system calls can require subsystems that do not exist in the domestic system. As a more particular example, the Mach IPC subsystem is used extensively for inter-process communication on the iOS system, but is missing from the Linux kernel of the Android system. FIG. 8 shows an example 800 of a process for directly compiling foreign source code into a domestic kernel to address this problem. In some embodiments, process 800 can compile foreign kernel APIs related to synchronization, memory allocation, process control, list management, and/or any other suitable services into domestic kernel APIs. The resulting cross-compiled module and/or subsystem can then be accessed by both foreign and domestic applications. In some embodiments, process 800 can be included in compile-time adaptation layer 610, as shown in and described above in connection with FIG. 6.

Process 800 can begin by creating distinct coding zones within the domestic kernel at 802. In some embodiments, three distinct coding zones can be created, corresponding to domestic, foreign, and intermediate zones, respectively. In some such embodiments, source code in the domestic zone can be restricted from accessing symbols in the foreign zone, and vice versa. Furthermore, source code in both the foreign and domestic zones can access symbols in the intermediate zone, and source code in the intermediate zone can access symbols in both the foreign and domestic zones.

Process 800 can identify symbol conflicts between the source code in the foreign zone and source code in the domestic zone at 804.

Process 800 can remap the identified conflicted symbols in the foreign zone to unique symbols at 806. Additionally, in some embodiments, process 800 can remap external symbols in the foreign source code to appropriate domestic kernel symbols. In some embodiments, process 800 can remap the conflicted symbols and the external foreign symbols through preprocessor tokens and/or static in-line functions located in the intermediate zone.

Process 800 can compile the foreign source code using the remapped symbols at 808. In some embodiments, any suitable compiler can be used to compile the foreign source code into the domestic kernel. In instances where foreign dependencies cannot be easily remapped, process 800 can implement one or more of the processes of the foreign dependencies in the intermediate and/or domestic zones before compiling the remaining foreign source code into the domestic kernel.

In instances where the foreign system is an iOS system, process 800 can be used to provide support for subsystems available in the XNU kernel within the Linux kernel of the Android system. For example, in some embodiments, process 800 can be used to compile libraries associated with user space priority threads in the iOS system. As a more particular example, in some embodiments, process 800 can compile the open-source library "bsd/kern/pthread_support.c" into the domestic kernel, thereby allowing foreign iOS applications to use mutexes, semaphores, condition variables, etc. supported by the library. As another example, in some embodiments, process 800 can be used to compile the majority of the Mach IPC subsystem of the iOS system into the Linux kernel of the Android system. In some such embodiments, portions of the Mach IPC subsystem that are unsuitable for direct compilation into the foreign Linux kernel can be re-implemented. As a more particular example, since the XNU kernel stack defaults to 16 KB, which is twice as large as the Linux kernel stack, in some embodiments, queuing structures in XNU source code can be re-implemented to interface with the Linux kernel environment, thereby allowing foreign applications using the XNU Mach IPC source code to use deep call stacks to access queuing structures recursively. As yet another example, in some embodiments, process 800 can be used to implement the I/O Kit device driver framework, as described below.

Figure 9:
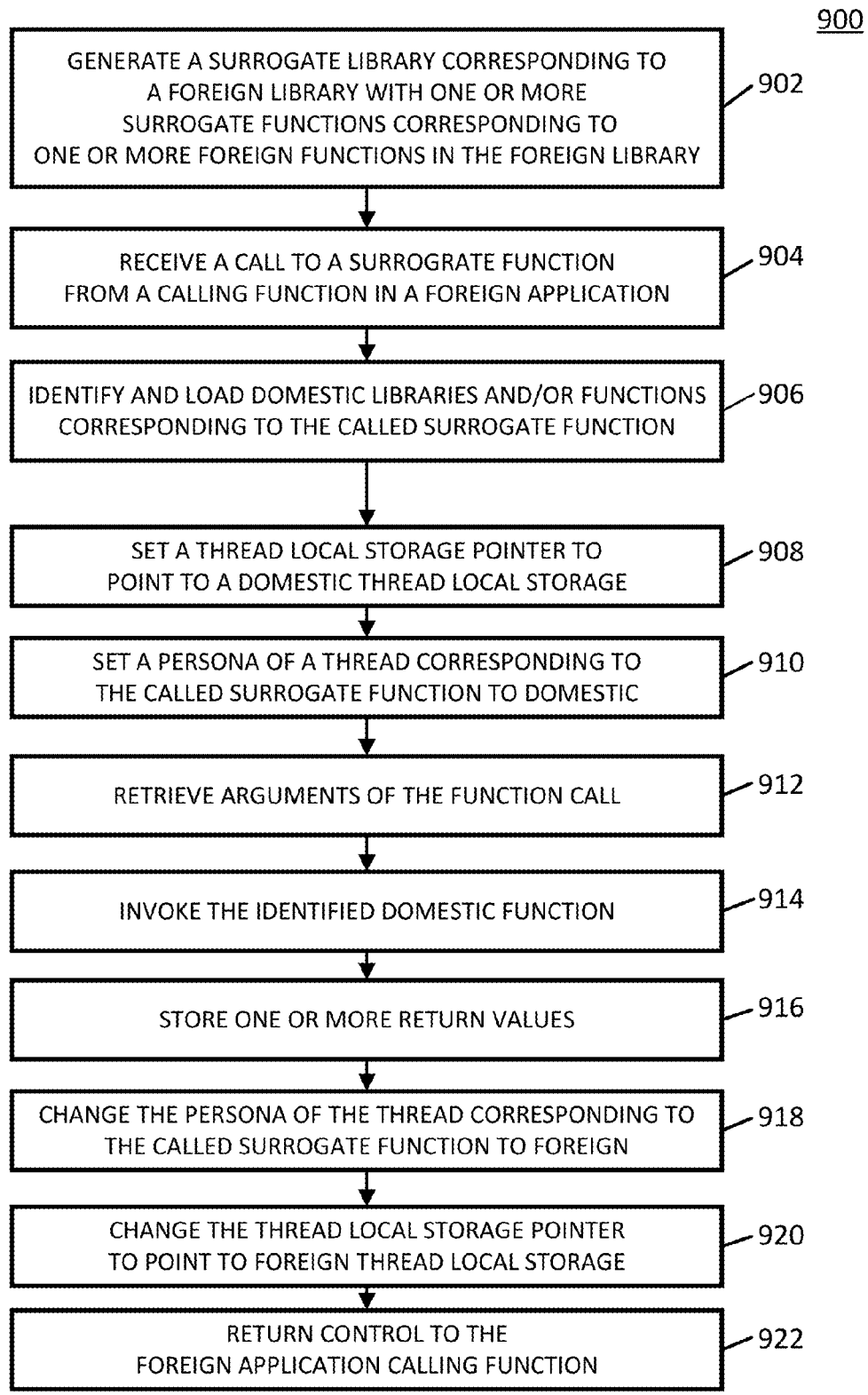
FIG. 9 shows an example of a process for utilizing surrogate functions to call domestic functions from a foreign application in accordance with some embodiments of the disclosed subject matter.

In some embodiments, a foreign application may make use of closed foreign libraries and/or proprietary hardware specific to user devices running the foreign system. For example, the OpenGL ES libraries on both Android and iOS systems directly communicate with GPUs on their respective systems through proprietary software and hardware interfaces, for example, the "ioctls" system call on the Android system and opaque IPC message on the iOS system. In such embodiments, the foreign libraries cannot be supported directly by the domestic kernel (e.g., by using process 700) and cannot be directly compiled into the domestic kernel (e.g., by using process 800), because the foreign libraries may be closed and/or because the foreign libraries interface with hardware not present on the domestic system. To address this problem, FIG. 9 shows an example 900 of a process for temporarily allowing a thread from a process executing in a foreign application to execute domestic functions from within the foreign application in accordance with some embodiments. Note that, in some embodiments, process 900 can be included in persona switching library 606 as shown in and described above in connection with FIG. 6.

Process 900 can begin by generating a surrogate library corresponding to a foreign library at 902. In some embodiments, the surrogate library can contain one or more surrogate functions which correspond to one or more foreign functions contained in the foreign library. Process 900 can use any suitable technique or combination of techniques to generate the surrogate library. For example, in some embodiments, process 900 can scan the foreign library for entry points and can generate a surrogate function (e.g., a wrapper function) for each identified entry point. In some embodiments, process 900 can replace the foreign library with the generated surrogate library by dynamically loading the surrogate library instead of the foreign library, thereby allowing function calls to the foreign library to be intercepted by the surrogate functions of the surrogate library. Note that, in some embodiments, the surrogate library can be generated by a process other than process 900. For example, in some embodiments, the surrogate library can be generated by a process running on server 102, and the surrogate library can then be transmitted to a user device (e.g., user device 106) running process 900, for example, via communication network 104.

Process 900 can receive a function call to one or more of the surrogate functions in the surrogate library from a foreign function of a foreign application at 904. In some embodiments, the function call can have any suitable number of arguments (e.g., zero, one, two, five, and/or any other suitable number). In some embodiments, the arguments associated with the received function call can be stored on a stack associated with the function call.

Process 900 can identify and load domestic libraries and/or domestic functions corresponding to the called surrogate function, and can locate an appropriate entry point to the identified domestic function at 906 using any suitable technique or combination of techniques. For example, in some embodiments, process 900 can load and interpret the domestic binaries using any suitable dynamic binary loader associated with the domestic system. As a more particular example, in instances where the domestic system is an Android system, the dynamic binary loader can be any suitable version of the Android Executable and Linkable Format (ELF) loader. As another example, in some embodiments, process 900 can identify the entry point to the domestic function and can store a pointer to the entry point, thereby allowing the determination of the entry point to be reused for subsequent calls to the surrogate function. As a more particular example, in some embodiments, the pointer to the entry point can be stored in a static variable. In some such embodiments, the static variable can have a scope local to the surrogate function.

Process 900 can set a pointer identifying a block of memory that is local to a thread associated with the surrogate function (e.g., thread-local storage) to point to a location in memory associated with the domestic function at 908.

Process 900 can set a persona of the thread associated with the surrogate function to a value that indicates that the thread is currently executing in a domestic mode at 910. As described above in connection with FIG. 7, in some embodiments, the persona of the thread can be set using a system call. As a more particular example, in some embodiments, the persona of the thread can be set using a passport system call, as described above in connection with FIG. 6.

Process 900 can retrieve arguments associated with the function call at 912. In embodiments in which the arguments were stored on a stack associated with the function call at block 904, process 900 can retrieve the stored arguments from the stack.

Process 900 can invoke the domestic function identified at block 906 using the retrieved arguments at 914. In some embodiments, process 900 can invoke the domestic function call using the pointer to the entry point of the domestic function identified and stored at block 906.

Process 900 can store one or more values returned from the domestic function call at 916. In some embodiments, process 900 can store the return value(s) on a stack associated with the function call.

Process 900 can change the persona of the thread to a different value that indicates that the thread is to switch back to executing in foreign mode at 918. Similarly to block 910, in some embodiments, process 900 can change the persona of the thread using a system call (e.g., a passport system call, and/or any other suitable type of system call). In some embodiments, any values stored in a block of memory local to the executing thread (e.g., in thread-local storage) can be copied into a portion of memory associated with the foreign function (e.g., a foreign thread-local storage). The copied values can include any suitable values, such as return values, values indicating errors and/or exit status of the thread (e.g., "errno," and or any other suitable values).

Process 900 can then return control to the foreign application at 922. The foreign application can then continue to execute.

In some embodiments, any of the processes described in connection with FIGS. 7, 8, and/or 9 can be implemented in architecture 600. In some embodiments, architecture 600 can provide binary compatibility for a variety of applications and/or services by using any of the processes (or any suitable combination of the processes) of FIGS. 7, 8, and/or 9. For example, the above-mentioned techniques can be used to provide support for foreign subsystems including hardware devices, input from a user device running a foreign application, graphics, etc.

As a more particular example, in some embodiments, architecture 600 can use compile-time adaptation layer 610 and/or process 800 to make underlying hardware devices available via I/O Kit to iOS applications running on an Android system in a manner similar to the manner in which I/O kit is used on the iOS system. Specifically, architecture 600 can compile the I/O Kit framework by adding a C++ runtime to the Linux kernel. The Linux kernel C++ runtime can then be used to directly compile the majority of the I/O Kit code found in the XNU "iokit" source directory. Architecture 600 can then make hardware devices available through either the domestic Linux device driver framework or the foreign I/O Kit. More specifically, architecture 600 can create an I/O kit registry entry for every registered Linux device (e.g., by using a hook in the Linux "device add" function, and/or using any other suitable function(s)), and architecture 600 can then provide an I/O Kit driver class that interfaces with the corresponding registered Linux devices. In this manner, foreign iOS applications running on a domestic Android system can use I/O Kit to query the I/O Kit registry to locate and/or access hardware devices.

As another more particular example, in some embodiments, architecture 600 can use one or more event reception threads (as shown in and described above in connection with FIGS. 4 and 5) to read events from input devices associated with a domestic system, translate the events into a format associated with a foreign application, and send the events to a port used by the foreign application to receive input events. Specifically, an event reception thread can detect events (e.g., a keypress, a touch and/or swipe on a touchscreen, a display rotating, and/or any other events as described above in connection with FIGS. 4 and 5) on a BSD socket. The event reception thread can then translate the detected events to a format associated with an iOS application, and can then send the translated events to the iOS application via a Mach IPC port. Architecture 600 can therefore support input received on Android system hardware for use on an iOS application.

Figure 10:
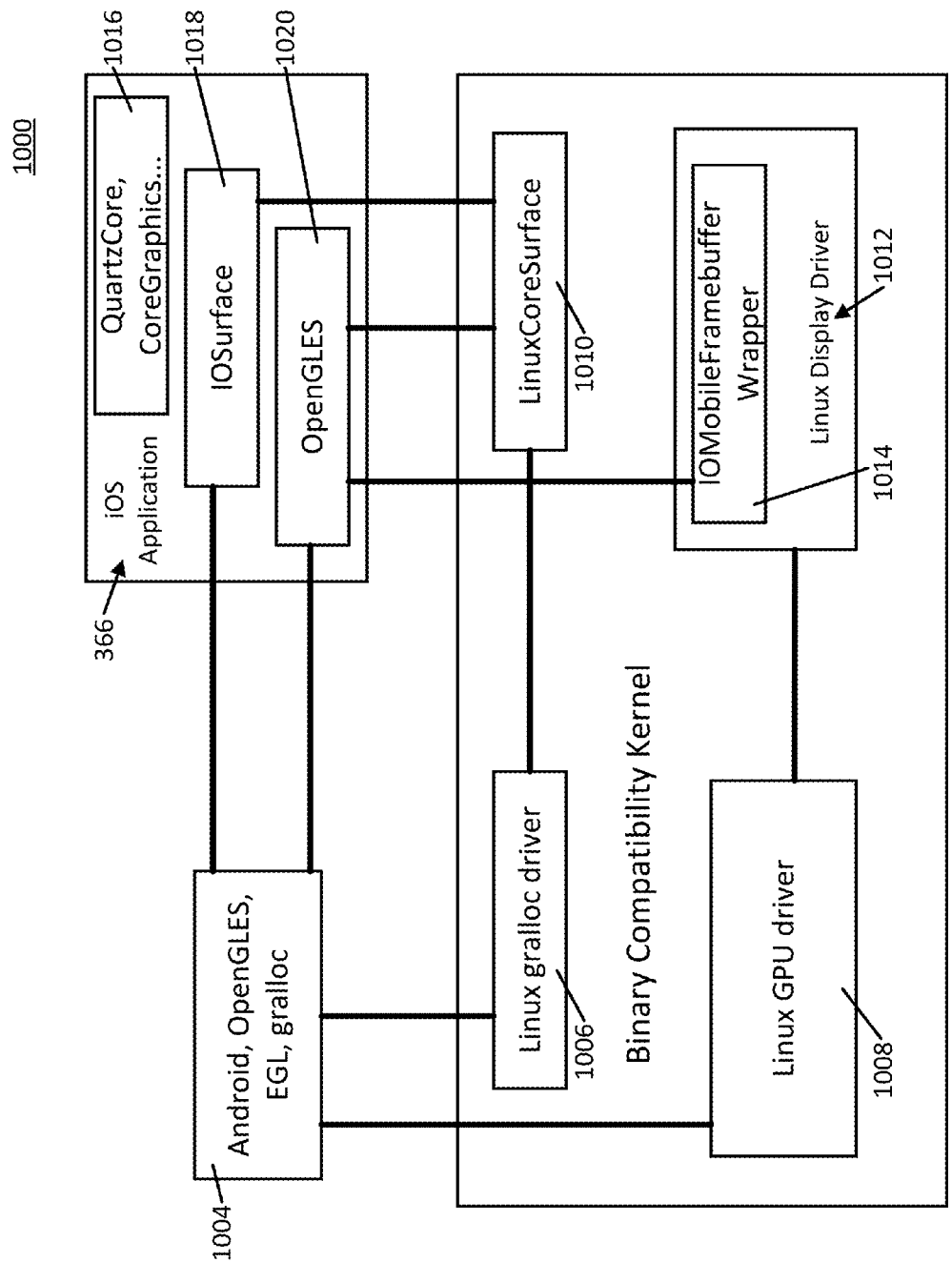
FIG. 10 shows an illustrative example of an architecture for providing graphics compatibility between an iOS system and an Android system in accordance with some embodiments of the disclosed subject matter.

As yet another more particular example, in some embodiments, architecture 600 can use a combination of the processes of FIGS. 7, 8, and 9 to provide binary compatibility for 2D and 3D graphics. FIG. 10 shows an example 1000 of an architecture for providing graphics compatibility between a foreign iOS system and a domestic Android system.

As shown in FIG. 10, an iOS application can, in some embodiments, use libraries such as QuartzCore library 1016, IOSurface library 1018, and OpenGLES library 1020. These libraries can in turn call closed source and/or proprietary libraries, which make opaque calls via Mach IPC to closed source kernel drivers. In some such embodiments, the closed source kernel drivers can control the hardware on which graphics are displayed.

Architecture 1000 can allow foreign iOS application to implement 2D graphics on the domestic Android system through a combination of techniques. In some embodiments, an unmodified QuartzCore library 1016 can be used by architecture 1000. In some embodiments, architecture 1000 can use API interposition (as described above in connection with FIG. 6) to interpose on IOSurface library 1018 in order to allocate the graphics memory needed to use the unmodified Android gralloc library (e.g., contained in Android libraries 1004) and underlying Linux gralloc driver 1006. In some embodiments, architecture 1000 can use API interposition and surrogate function calls (e.g., process 900 as shown in and described above in connection with FIG. 9) to the Android gralloc library to tie the allocated graphics memory to Android GraphicBuffer objects designed to be shared between graphics hardware via OpenGL ES and the CPU via direct pixel manipulation. In some embodiments, instead of using the IOMobileFrameBuffer of the iOS system to cause the graphics to be displayed, architecture 1000 can create an IOMobileFrameBuffer wrapper 1014 around an existing Linux display driver 1012, which can communicate with a Linux GPU driver 1008. Additionally, in some embodiments, architecture 1000 can include a LinuxCoreSurface module 1010 to provide zero-copy semantics expected by IOSurface library 1018. In such embodiments, LinuxCoreSurface module 1010 can be a reverse-engineered IOCoreSurface I/O Kit driver.

Additionally or alternatively, in some embodiments, architecture 1000 can allow foreign iOS applications to implement 3D graphics on the domestic Android system through use of surrogate functions (e.g., as described above in connection with FIG. 9) to call domestic Android graphics libraries from a foreign iOS application. For example, architecture 1000 can replace OpenGL ES library 1020 in its entirety by using surrogate functions to call Android graphics libraries (e.g., in Android library module 1004). As iOS OpenGL ES library 1020 consists of a standard OpenGL ES API and proprietary EAGL extensions, architecture 1000 can provide a surrogate library with surrogate entry points for every exported symbol in both the standard OpenGL ES API and the proprietary EAGL extensions. As a more particular example, architecture 1000 can provide surrogate functions which call the Android Open GL ES library (e.g., in Android library module 1004). More specifically, in some embodiments, architecture 1000 can create the surrogate functions using an automated script that analyzes exported symbols in the iOS OpenGL ES Mach-O library, searches through a directory of Android ELF shared objects for a matching export, and automatically generates the surrogate function. As another more particular example, architecture 1000 can use surrogate function calls to the Android EGL functions (e.g., in Android library module 1004) to implement the proprietary EGL extensions. Architecture 1000 can then use the Android EGL functions in combination with SurfaceFlinger service 310 (as described above in connection with FIG. 3) to manage memory associated with windows into which graphics from foreign iOS applications are rendered.

In accordance with various embodiments, mechanisms for binary compatible graphics support in mobile operating systems are provided.

Generally speaking, these mechanisms can provide binary compatible graphics support for executing applications built for different mobile operating systems, such as iOS and Android, together on the same mobile device. These mechanisms can be used in a variety of applications, such as providing compatibility between device-specific Internet browsers and other graphics-intensive applications.

In some embodiments, these mechanisms can provide binary compatible graphics support by extending diplomatic functions to perform library-wide prelude and postlude operations in the context of the foreign operating system before and after domestic library usage. For example, this can be done by introducing diplomatic functions which allow foreign applications to use domestic libraries to access proprietary software and hardware interfaces on the mobile device. It should be noted that a thread has two personas, a foreign one for executing foreign code with a foreign kernel ABI (e.g., the iOS operating system) and a domestic one for executing domestic code with a domestic kernel ABI (e.g., the Android operating system). A diplomatic function can be a function which temporarily switches the persona of a calling thread to execute domestic code from within a foreign application, or vice versa. Using such diplomatic functions, the mechanisms can replace calls into foreign hardware-managing libraries, such as GLES, with calls into domestic libraries that manage domestic GPU hardware. Each diplomatic function can map iOS functionality onto equivalent Android functionality.

Figure 11:
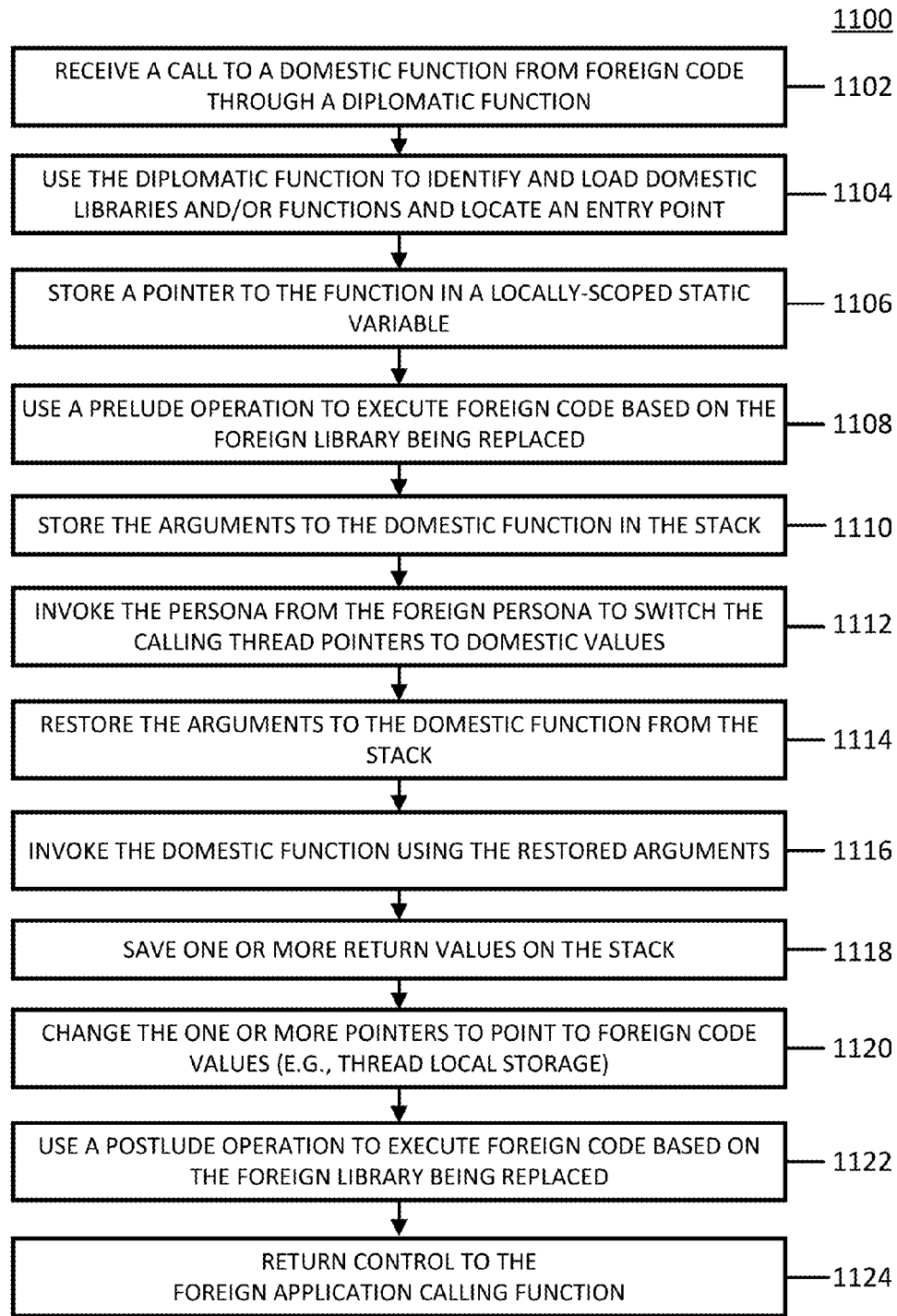
FIG. 11 shows an example of a process for providing binary compatible graphics support between a foreign operating system and a domestic operating system in accordance with some embodiments of the disclosed subject matter.

In a more particular example, the mechanisms can call a domestic function from foreign code through a diplomatic function. As shown in FIG. 11, process 1100 can receive a call to a domestic function from foreign code through a diplomat at 1102. In some embodiments, the function call can have any suitable number of arguments (e.g., zero, one, two, five, and/or any other suitable number). In some embodiments, the arguments associated with the received function call can be stored on a stack associated with the function call. In response to receiving the call, process 1100 can, in some embodiments, use a diplomatic function to identify and load the appropriate domestic library and can locate the required entry point at 1104, where a pointer to the function in a locally-scoped static variable is stored at 1106 for efficient reuse.

For example, in some embodiments, process 1100 can load and interpret the domestic binaries using any suitable dynamic binary loader associated with the domestic system. As a more particular example, in instances where the domestic system is an Android system, the dynamic binary loader can be any suitable version of the Android Executable and Linkable Format (ELF) loader. As another example, in some embodiments, process 1100 can identify the entry point to the domestic function and can store a pointer to the entry point, thereby allowing the determination of the entry point to be reused for subsequent calls to the diplomatic function. As a more particular example, in some embodiments, the pointer to the entry point can be stored in a static variable. In some such embodiments, the static variable can have a scope local to the diplomatic function.

At 1108, in some embodiments, process 1100 can continue by using a prelude operation to execute foreign code based on the foreign library being replaced. For example, as shown in the illustrative architecture of FIG. 12, the EAGL implementation described herein uses a custom library, libEGLbridge, that can provide Android functionality through a set of one or more diplomats. More particularly, the libEGLbridge library can use Android GraphicBuffer objects, which use the gralloc or HW Composer APIs to allocate memory. Such APIs can be provided in vendor-proprietary EGL and GLES libraries. For example, the libEGLbridge library can link against the vendor EGL and GLES library. The mechanism by which GraphicBuffer memory can be shared between APIs such as GLES and EGL requires that the gralloc and HW Composer APIs use the same GLES connection, established by EGL, that the GLES rendering function use. In other words, a GraphicBuffer allocated by the libEGLbridge library using the first instantiation of the EGL and GLES libraries cannot be used by GLES functions in replicas created by multiple iOS EAGL contexts. Accordingly, the mechanisms described herein can avoid such library dependencies by separating the libEGLbridge functionality into two pieces—libEGLbridge 1208, which contains the diplomats used by the iOS application code 366, and libui_wrapper 1214, which contains the actual logic. For example, when a new EAGLContext object is created, a diplomat in libEGLbridge 1208 simultaneously creates a replica of the libui_wrapper library and the EGL and GLES libraries by using the prelude operation of the diplomatic function. In this example, the libui wrapper functionality uses the same replica of GLES as the gralloc functions which allocate a GraphicBuffer.

In some embodiments, process 1100 can store the arguments to the domestic function call on the stack at 1110.

In some embodiments, process 1100 can set a persona of the thread associated with the foreign persona to a value that indicates the thread is currently executing in a domestic mode at 1112. For example, as described above, the persona of the thread can be set using a system call (e.g., syscall). As a more particular example, in some embodiments, the set persona syscall can be invoked from the foreign persona to switch the calling thread's kernel ABI, and thread local storage (TLS) area pointer to their domestic values.

In some embodiments, process 1100 can retrieve arguments associated with the domestic function call at 1114. For example, in embodiments in which the arguments were stored on a stack associated with the function call, process 1100 can restore the arguments to the domestic function call from the stack.

In some embodiments, process 1100 can invoke the identified domestic function using the retrieved arguments at 1116. In some embodiments, process 1100 can invoke the domestic function call using the pointer to the entry point of the domestic function identified and stored at block 1106.

In some embodiments, process 1100 can store one or more values returned from the domestic function call at 1118. In some embodiments, process 1100 can store the return value (s) on a stack associated with the function call.

In some embodiments, process 1100 can change the persona of the thread to a different value that indicates that the thread is to switch back to executing in foreign mode at 1120. Similarly to block 1112, in some embodiments, process 1100 can change the persona of the thread using a system call. For example, the set persona syscall can be invoked from the domestic persona to switch the kernel ABI and thread local storage area pointers back to the foreign code values. In some embodiments, any values stored in a block of memory local to the executing thread (e.g., in thread-local storage) can be copied into a portion of memory associated with the foreign function (e.g., a foreign thread-local storage). The copied values can include any suitable values, such as return values, values indicating errors and/or exit status of the thread (e.g., "errno," and or any other suitable values).

In some embodiments, process 1100 can execute a postlude operation that executes foreign code based on the foreign library being replaced at 1122. Similar to the prelude operation described above, the postlude operation can be common to all diplomats and can be specified at compile time. It should be noted that diplomats can use the prelude and postlude operations to migrate thread local data between the target and running threads. It should also be noted that, by gating the Android pthread_key_create and pthread_key_delete hooks in the prelude and postlude operations of each graphics diplomat, the mechanisms described herein monitor graphics-specific thread local storage slot allocations, thereby allowing these mechanisms to selectively migrate the graphics-relevant thread local storage data between the target and running thread's Android personas.

In some embodiments, process 1100 can then return control to the foreign application at 1122. For example, the domestic function's return value can be restored from the stack and control can be returned to the calling foreign function. The foreign application can then continue to execute.

Using these diplomatic functions, these mechanisms can, for example, provide a graphics compatibility architecture that runs unmodified iOS binaries on an Android operating system, including iOS applications and graphics frameworks.

In some embodiments, these mechanisms can provide binary compatible graphics support by providing diplomat usage patterns. Diplomat usage patterns can, for example, leverage Android graphics libraries to run iOS applications. Diplomat usage patterns can include direct diplomats, indirect diplomats, data-dependent diplomats, and multi diplomats.

In some embodiments, direct diplomats can be used to directly invoke a corresponding Android function. For example, standard GLES functions that are not augmented in any way by extensions can be implemented using direct diplomats.

In some embodiments, indirect diplomats can be iOS functions that may require a small amount of wrapper code or customized logic code before calling a corresponding diplomatic function. These mechanisms can use standard API interposition and a small amount of custom iOS code to support indirect diplomats. The custom logic can run in the foreign, iOS, context and can redirect APIs to similar Android APIs with different names or can manipulate or otherwise modify input data to match an existing Android implementation. For example, APPLE_fence is an extension implemented in iOS but not in Android. These mechanisms can implement this extension using an indirect diplomat based on a similar extension, NV_fence, which is present on devices such as the NVIDIA Nexus 7 tablet. Small iOS entry points corresponding to the APPLE_fence API can perform minor input re-arranging and then can call into the Android GLES library through NV_fence diplomats (Android GLES NV_fence API).

In some embodiments, data-dependence diplomats can augment standard diplomats by performing input-dependent logic or implementation before optionally calling the Android function. For example, data-dependent diplomats can be iOS functions that can require data-dependent logic or implementation. In a more particular example, if an iOS extension adds the ability to render a new pixel format that is unsupported by the Android operating system, GLES functions that allocate or manipulate textures may need to be interposed-on and logic added based on the texture type passed to the function. That is, GLES functions that allocate or manipulate textures can use data-dependent diplomats that can understand the iOS texture format and manipulate it into a form understood by Android functions. For example, the standard GLES glGetString function in iOS has been modified by Apple to accept a non-standard parameter name, which is unknown in Android. That parameter name is intended to return Apple-proprietary extensions available on the platform. These mechanisms can use a data-dependent diplomat to support this extension. It can intercept calls to glGetString and return a string indicating that no Apple-proprietary extensions are available when the input parameter matches the apple-proprietary extension parameter.

It should be noted that, in some instances, data-dependent diplomats may not invoke an Android function at all due to a lack of corresponding Android functionality. For example, the APPLE_row_bytes extension handles two extra parameters to the glPixelStorei function, PACK_ROW_BYTES_APPLE and UNPACK_ROW_BYTES_APPLE, and maintains state associated with the current GLES context which controls how three GLES functions, glTexImage2D, glTexSubImage2D, and glReadPixels, read in or write out pixel data. These three GLES functions can be implemented using data-dependent diplomats such that when the APPLE_row_bytes extension is being used, the mechanisms can read in and write out the packed data manually.

In some embodiments, multi-diplomats are iOS functions or extension logic that do not map cleanly to a single Android function, and whose behavior is too complex for wrapper or glue logic. These functions leverage several different Android library functions through two or more diplomats. In a more particular example, iOS GLES functions that manipulate renderbuffers are implemented using multi-diplomats due to a limitation in Android's EGLImage extension. If not for this limitation, those GLES functions could be simply implemented using direct diplomats in some embodiments.

It should be noted that graphics resource management, including display and window management, is done in iOS using Apple's own EAGL Objective-C API and in the Android operating system using the Khronos standardized EGL API. It should also be noted that the Android EGL library performs similar graphics resource management functions to the Apple EAGL library. Accordingly, these mechanisms construct an EAGL implementation from a combination of Android EGL and GLES libraries using multi-diplomats with additional logic. This is generally referred to as the libEGLbridge library shown in FIG. 12. This can, for example, allow the use of a single diplomat which calls into a custom Android API that uses standard Android functions and libraries to perform the required function.

For example, the mechanisms can implement EAGL functions for associating GLES objects with IOSurfaces using multi-diplomats. The functions can create EGLImage objects using the Android EGL APIs and can connect them to GLES objects using GLES extension APIs. It should be noted that the mechanisms can force the use of textures to leverage Android's EGLImage extension. This can be done by interposing on iOS's EAGL and GLES functions that manipulate renderbuffers and transparently translating their functionality, using multi-diplomats, to manipulate the underlying Android GLES textures used in place of renderbuffers.

In another example, because EAGL does not use the default framebuffer, the standard Android eglSwapBuffers will not work to transfer rendered frame data to the screen or window memory. To display the contents of an off-screen framebuffer into which an iOS application has rendered content, the mechanisms can implement the EAGL presentRenderbuffer function using a multi-diplomat. This diplomat can use GLES vertex and fragment shader programs, via multiple Android GLES APIs, to render the off-screen framebuffer contents into the default framebuffer. From the default framebuffer, the mechanisms can use eglSwapBuffers to display the content.

With regard to memory management, iOS uses IOSurface objects for graphics memory management, where kernel-level IOSurface support provides the zero-copy support which allows IOSurface objects to be passed between libraries and applications. On the other hand, the Android operating system manages graphics memory transfers using GraphicBuffer objects. Accordingly, these mechanisms provide a mapping between IOSurfaces objects and GraphicBuffer objects for GLES to function. This can be supported by, for example, object life cycle management and cross-API object sharing.

With regard to object life cycle management, it should be noted that IOSurfaces are created using IOSurfaceCreate. This function allocates the necessary memory buffer and connects the allocated region to the supporting kernel infrastructure. Accordingly, in some embodiments, these mechanisms can impose on IOSurfaceCreate using an indirect diplomat to create an Android GraphicBuffer object as the underlying backing graphics memory for an IOSurface. Similarly, as the created IOSurface is associated with GLES textures or other library objects, these mechanisms can use indirect diplomats to interpose Android GraphicBuffer management. For example, these mechanisms can interpose on the glDeleteTextures API and can remove any corresponding connection to the underlying Android GraphicBuffer.

With regard to cross-API object sharing, it should be noted that an IOSurface can be used by 2D and 3D rendering APIs. These 2D APIs, such as CoreGraphics, use the CPU to draw directly into IOSurfaces as opposed to sending commands to the GPU to render content into the memory. To allow 2D and 3D APIs to share IOSurfaces, iOS provides the IOSurfaceLock and IOSurfaceUnlock functions to lock and unlock an IOSurface for CPU-only access. Accordingly, in some embodiments, these mechanisms can interpose on the IOSurfaceLock and IOSurfaceUnlock functions with multi-diplomats. When an IOSurface is locked, these mechanisms can disassociate the Android GraphicBuffer from the connected GLES texture, thereby allowing it to be locked for CPU-only access. It should be noted, however, that a GLES texture is to be associated with some memory object such that, while the IOSurface is locked for CPU access, the multi-diplomat rebinds the GLES texture to a single-pixel buffer allocated by glTexImage2D. The multi-diplomat can then destroy the EGLImage object associated with the texture, which disassociates the Android GraphicBuffer.

In another example, these mechanisms can interpose on the IOSurfaceUnlock function with another multi-diplomat. For example, the mechanisms can create a new EGLImage object and can rebind it and the GraphicBuffer back to the GLES texture. It should be noted that the disassociation and re-association process can be transparent to iOS's GLES.

It should be noted that the iOS and Android operating systems are both heavily multi-threaded environments, but differ in the level of GLES threading. In some embodiments, these mechanisms can provide binary compatible graphics support by providing thread impersonation approaches that allow one thread to temporarily take on the persona of another thread to perform some action that may be tread-dependent. This can be used, for example, to support iOS's more general multi-threaded GLES on Android. For example, to support iOS's model of any thread being able to use a GLES context, these mechanisms can cause a thread to impersonate the creator of a GLES context in Android if it would otherwise be precluded from using that GLES context.

It should be noted that vendor graphics libraries can make use of per-thread data structures that are stored in thread local storage (TLS). TLS is an array of void pointers unique to each thread. Each array entry is a slot. Some TLS slots can be reserved for system use for things such as a thread-local errno value, but applications can reserve other slots using the pthread key create function, which returns a globally-unique TLS slot ID. A given thread passes the returned slot ID into the pthread_getspecific or pthread_setspecific functions to get or set a thread-local, or thread-private, value. Since thread-dependent state is stored in the TLS, the mechanisms can provide thread impersonation for GLES by migrating the graphics-related TLS state of one thread to another as needed.

In some embodiments, thread impersonation for graphics in an Android operating system can be done as follows. First, the mechanisms can identify graphics-related TLS state. Because the exact content of this data is opaque and tightly coupled to the operation of the libraries, the mechanisms can discovers which TLS values are used by vendor GLES and EGL libraries by modifying Android's bionic libc to send out a notification whenever a new TLS key is reserved using pthread_key_create. Second, whenever a GLES context is created, the mechanisms can tie the graphics-related TLS of the thread that created the GLES context to the context. Third, whenever a thread calls a GLES function using a GLES context that it did not create, the mechanisms can save that thread's graphics-related TLS state and replaces it with the TLS associated with the GLES context. Updates can be made to the TLS as needed as the thread executes the function, and these updates are reflected in the TLS associated with the GLES context as well. Once the call returns, the mechanisms can restore that thread's original graphics-related TLS state. Since vendor graphics libraries are opaque, it should be noted that the TLS slots they reserve are not used by any other subsystems since their use of TLS slots are also opaque to other subsystems.

It should be noted that a thread has both an iOS persona for when it is executing iOS code, and an Android persona for when it is executing Android code. Each persona can have its own TLS. The mechanisms, in some embodiments, can ensure that graphics-related use of the TLS in the iOS persona matches what is expected by iOS apps. This can be done in almost all cases by simply relying on iOS libraries to manipulate the TLS in the iOS persona as needed. One exception is when a thread submits an asynchronous job to GCD. When this happens, the mechanisms can associate the TLS data of the dispatching thread with the EAGL context such that when the GCD job is run in a different thread, its TLS can be properly updated.

It should also be noted that the mechanisms ensure that, when diplomatic functions are used, thread migration in Android is done to match the necessary iOS GLES and EAGL contexts, i.e., thread migration occurs for each persona. For example, if thread A passes its context to thread B before calling a diplomat, thread B needs to impersonate thread A in both iOS and Android. However, iOS and Android use separate TLS areas for execution, and the only place that has knowledge of both TLS areas is the kernel. Thus, to effect thread migration, the mechanisms can introduce two new system calls: locate tls and propagate tls. The locate tls syscall can extract TLS values from any given persona in which the thread has executed. Similarly, the propagate tls syscall can push TLS values into any given persona. Using these two syscalls, the mechanisms can ensure proper GLES functionality across thread migration.

It should be noted that the iOS EAGL library can instantiate multiple EAGLContext objects, each with their own GLES connection and where each GLES connection can use a different API version. The Android operating system, however, does not support this and a single EGL connection to single GLES API version can be made per-process.

In some embodiments, these mechanisms can provide binary compatible graphics support by dynamic library replication that creates duplicate loaded instances of a dynamic library. Each new library instance, or replica, can be loaded and linked as if no other libraries have been loaded. This causes each replica to occupy its own virtual memory space and invoke its own pseudo-private copies of library functions and their constituent dependencies.

For example, the NVIDIA graphics support library, libGLESv2_tegra.so, uses the libnvrm.so library which, in turn, uses the libnvos.so library. Each replica of the libGLESv2_tegra.so library can occupy its own virtual address space and can also link against privately loaded copies of all required libraries, such as libnvrm.so and libnvos.so.

In another example, on a call to dlopen the linker can check to see if it has already loaded the library. If the library was previously loaded, the linker can return the same handle and does not re-initialize or reload anything. In a dynamic-library-replication-enabled linker, a new function, dlforce, can be introduced which opens the library (the replica), and all its dependencies, just as if they were never previously loaded. The replica and its dependencies can have unique virtual addresses, and all of their library constructors can be called. To ensure that library code in a replica can use the dynamic loader, the mechanisms can also modify the dlsym and dlopen functions to use only those libraries loaded from the dlforce function. This can create, for example, isolated trees of libraries.

In some embodiments, these mechanisms can use dynamic library replication in the Android EGL open source library through a custom EGL extension named EGL_CU_multi_context and a supporting library, libui wrapper. This extension API can add four EGL functions for creating and manipulating EGLContext objects that maintain isolated, unique GLES connections within the same process: eglReInitializeMC, eglSwitchMC, eglGetTLSMC, and eglSetTLSMC. The libui wrapper library can link against the vendor GLES and EGL libraries and can encapsulate other Android system libraries which implicitly link against GLES or EGL. For example, the eglReInitializeMC function can be used to create a replica of the vendor EGL and GLES libraries. The eglSwitchMC functions can be used to allow a thread to select which replica, and thus which GLES connection, it will use by setting the thread's EGLContext object to the one contained within the replica. Creating EGL and GLES replicas, through a modified Android open source EGL library, results in unique GLES connection management challenges related to TLS. The unmodified Android EGL library can allow one EGL-to-GLES connection (EGL-Connection object) per-process, and it stores this information in a library-static global variable. Creating replicas of the vendor EGL and GLES libraries can allow multiple threads to use different EGLConnections concurrently. A single, global EGLConnection variable no longer suffices, so the EGL_CU_multi_context extension stores this per-thread EGLConnection object in the TLS. It should be noted that a common paradigm in GLES programming is to create a context on one thread (generally the main thread), and pass the context information to another thread which will perform rendering or texture loading functions. Because the EGL_CU_multi_context extension has moved the previously global GLES connection information into a thread-local variable, the ability to copy, or migrate, TLS values between threads can be accomplished using the above-mentioned thread impersonation approaches through the eglGetTLSMC and eglSetTLSMC extension functions.

Figure 12:
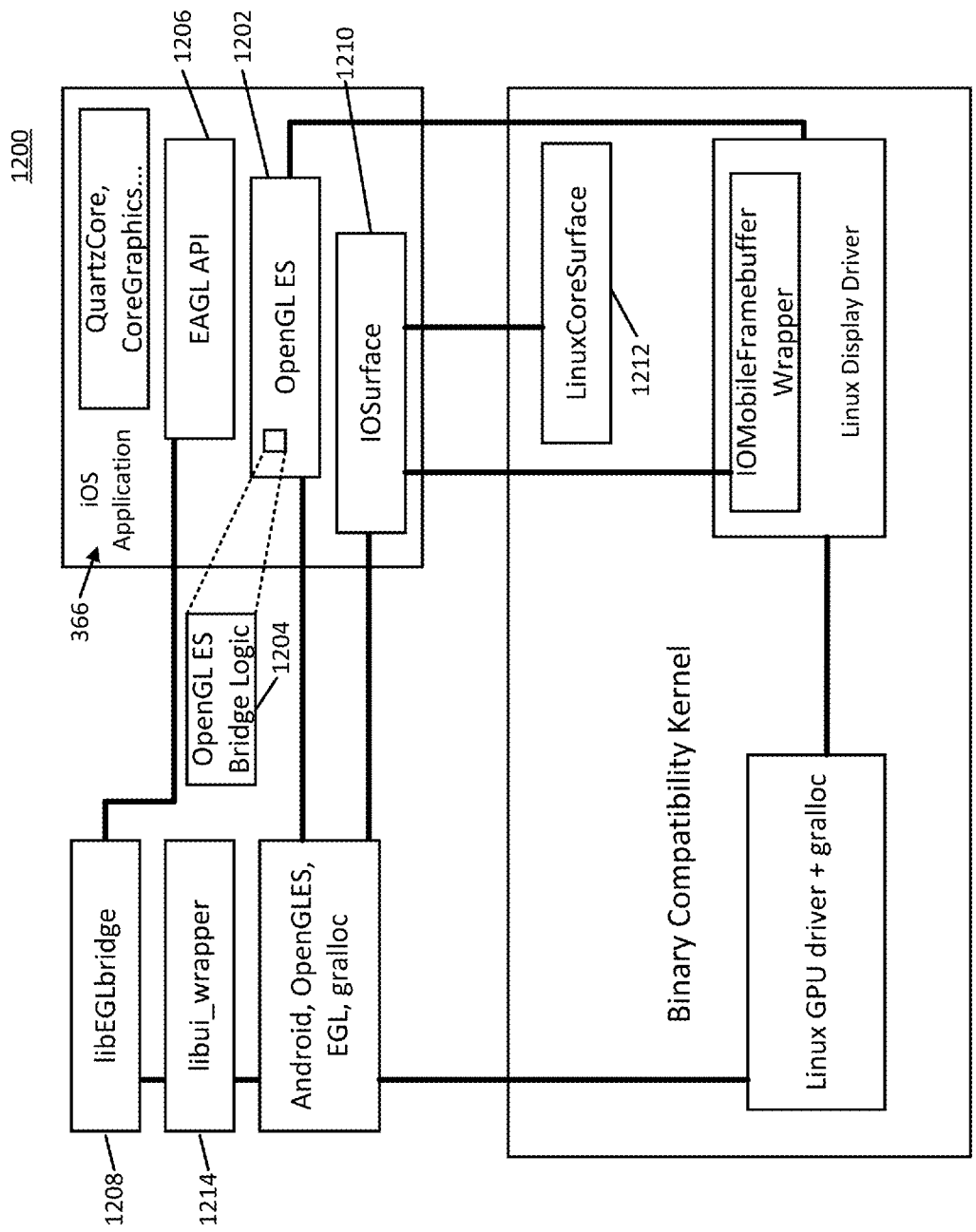
FIG. 12 shows another illustrative example of an architecture for providing binary compatible graphics support between an iOS system and an Android system in accordance with some embodiments of the disclosed subject matter.

FIG. 12 shows an example 1200 of an architecture for providing binary graphics compatibility between a foreign iOS system and a domestic Android system in accordance with some embodiments of the disclosed subject matter.

As described above, in some embodiments, architecture 1200 can include the diplomatic OpenGL ES library 1202 for iOS GLES support, which includes OpenGL ES Bridge Logic 1204 to support indirect and data-dependent diplomats.

As also described above, in some embodiments, architecture 1200 can include the re-implemented Apple EAGL API 1206 for iOS display and window management API support, which leverages multi-diplomats composed in the diplomatic libEGLbridge library 1208.

As also described above, in some embodiments, architecture 1200 can include a diplomatic IOSurface library 1210 and LinuxCoreSurface 1212, a re-implementation of the iOSkernel framework, IOCoreSurface.

As also described above, in some embodiments, architecture 1200 can include the diplomatic libEGLbridge library 1208 and an Android implementation library, libui wrapper 1214. These libraries can provide multi-threaded iOS OpenGL ES support using thread impersonation and iOS EAGL Multi-Context support using dynamic library replication.

In some embodiments, at least some of the above described blocks of the processes of FIGS. 4, 7, 8, 9, and 11 can be executed or performed in any order or sequence not limited to the order and sequence shown in and described in connection with the figures. Also, some of the above blocks of FIGS. 4, 7, 8, 9, and 11 can be executed or performed substantially simultaneously where appropriate or in parallel to reduce latency and processing times. Additionally or alternatively, some of the above described blocks of the processes of FIGS. 4, 7, 8, 9, and 11 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as magnetic media (such as hard disks, floppy disks, and/or any other suitable magnetic media), optical media (such as compact discs, digital video discs, Blu-ray discs, and/or any other suitable optical media), semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for binary compatible graphics support are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for binary compatibility, comprising:
   receiving, from a foreign application, a function call having one or more arguments to a surrogate function, wherein the surrogate function is contained in a surrogate library, and wherein the surrogate library corresponds to a foreign library associated with a foreign function call;
   identifying, using a hardware processor, a domestic function corresponding to the surrogate function, wherein the domestic function is identified by mapping the one or more arguments from of the function call from structures associated with the surrogate function to structures associated with the domestic function;
   executing a block of code in the foreign library, wherein the block of code is identified based on a portion of code in the foreign library that is replaced with the surrogate function;
   invoking the identified domestic function using the one or more arguments, wherein invoking the identified domestic function includes:
      determining, from within a thread of the surrogate function, that a new object is to be created, wherein the new object is connected to a container, wherein the container contains one or more objects, and wherein the new object defines a particular version of an Application Programming Interface to be used with the container;
      causing new instances of libraries associated with the new object and with the particular version of the Application Programming Interface to be loaded and linked with unique virtual addresses;
      calling one or more constructors of the loaded and linked libraries; and
      storing information associated with the new object in a first portion of memory associated with the thread;
   storing values including one or more error codes returned from the invoked domestic function;
   executing a second block of code in the foreign library, wherein the second block of code is identified based on the portion of code in the foreign library that is replaced with the surrogate function; and
   continuing to execute the foreign application.

2. The method of claim 1, further comprising:
   prior to invoking the identified domestic function using the one or more arguments, modifying at least one of the one or more arguments.

3. The method of claim 1, wherein the surrogate function is configured to return a predetermined value in response to determining that at least one of the one or more arguments corresponds to a parameter proprietary to the foreign application.

4. The method of claim 1, further comprising:
   determining that the function call is to a plurality of surrogate functions;
   identifying a plurality of domestic functions corresponding to the plurality of surrogate functions; and
   invoking the plurality of identified domestic functions.

5. The method of claim 1, further comprising:
   storing a value that associates the first portion of memory with an identity of the container;
   determining that a function associated with an object within the container has been called from a second thread;
   saving one or more values indicating a state of a second portion of memory associated with the second thread;
   recalling the stored value to identify the first portion of memory;
   replacing the second portion of memory with the first portion of memory;
   calling the function from within the second thread; and
   restoring the second portion of memory using the saved one or more values.

6. A system for binary compatibility, the system comprising:
   a hardware processor that is configured to:
      receive, from a foreign application, a function call having one or more arguments to a surrogate function, wherein the surrogate function is contained in a surrogate library, and wherein the surrogate library corresponds to a foreign library associated with a foreign function call;
      identify, using a hardware processor, a domestic function corresponding to the surrogate function, wherein the domestic function is identified by mapping the one or more arguments from of the function call from structures associated with the surrogate function to structures associated with the domestic function;
      execute a block of code in the foreign library, wherein the block of code is identified based on a portion of code in the foreign library that is replaced with the surrogate function;
      invoke the identified domestic function using the one or more arguments invoking the identified domestic function using the one or more arguments, wherein invoking the identified domestic function includes:
  determining, from within a thread of the surrogate function, that a new object is to be created, wherein the new object is connected to a container, wherein the container contains one or more objects, and wherein the new object defines a particular version of an Application Programming Interface to be used with the container;
  causing new instances of libraries associated with the new object and with the particular version of the Application Programming Interface to be loaded and linked with unique virtual addresses;
  calling one or more constructors of the loaded and linked libraries; and
  storing information associated with the new object in a first portion of memory associated with the thread;
store values including one or more error codes returned from the invoked domestic function;
execute a second block of code in the foreign library, wherein the second block of code is identified based on the portion of code in the foreign library that is replaced with the surrogate function; and
continue to execute the foreign application.

7. The system of claim 6, wherein the hardware processor is further configured to:
  prior to invoking the identified domestic function using the one or more arguments, modify at least one of the one or more arguments.

8. The system of claim 6, wherein the surrogate function is configured to return a predetermined value in response to determining that at least one of the one or more arguments corresponds to a parameter proprietary to the foreign application.

9. The system of claim 6, wherein the hardware processor is further configured to:
  determine that the function call is to a plurality of surrogate functions;
  identify a plurality of domestic functions corresponding to the plurality of surrogate functions; and
  invoke the plurality of identified domestic functions.

10. The system of claim 6, wherein the hardware processor is further configured to:
  store a value that associates the first portion of memory with an identity of the container;
  determine that a function associated with an object within the container has been called from a second thread;
  save one or more values indicating a state of a second portion of memory associated with the second thread;
  recall the stored value to identify the first portion of memory;
  replace the second portion of memory with the first portion of memory;
  call the function from within the second thread; and
  restore the second portion of memory using the saved one or more values.

11. A non-transitory computer-readable medium containing computer executable instructions that, when executed by a processor, cause the processor to perform a method for binary compatibility, the method comprising:
  receiving, from a foreign application, a function call having one or more arguments to a surrogate function, wherein the surrogate function is contained in a surrogate library, and wherein the surrogate library corresponds to a foreign library associated with a foreign function call;
  identifying, using a hardware processor, a domestic function corresponding to the surrogate function, wherein the domestic function is identified by mapping the one or more arguments from of the function call from structures associated with the surrogate function to structures associated with the domestic function;
  executing a block of code in the foreign library, wherein the block of code is identified based on a portion of code in the foreign library that is replaced with the surrogate function;
  invoking the identified domestic function using the one or more arguments invoking the identified domestic function using the one or more arguments, wherein invoking the identified domestic function includes:
    determining, from within a thread of the surrogate function, that a new object is to be created, wherein the new object is connected to a container, wherein the container contains one or more objects, and wherein the new object defines a particular version of an Application Programming Interface to be used with the container;
    causing new instances of libraries associated with the new object and with the particular version of the Application Programming Interface to be loaded and linked with unique virtual addresses;
    calling one or more constructors of the loaded and linked libraries; and
    storing information associated with the new object in a first portion of memory associated with the thread;
  storing values including one or more error codes returned from the invoked domestic function;
  executing a second block of code in the foreign library, wherein the second block of code is identified based on the portion of code in the foreign library that is replaced with the surrogate function; and
  continuing to execute the foreign application.

12. The non-transitory computer-readable medium of claim 11, wherein the method further comprises:
  prior to invoking the identified domestic function using the one or more arguments, modifying at least one of the one or more arguments.

13. The non-transitory computer-readable medium of claim 11, wherein the surrogate function is configured to return a predetermined value in response to determining that at least one of the one or more arguments corresponds to a parameter proprietary to the foreign application.

14. The non-transitory computer-readable medium of claim 11, wherein the method further comprises:
  determining that the function call is to a plurality of surrogate functions;
  identifying a plurality of domestic functions corresponding to the plurality of surrogate functions; and
  invoking the plurality of identified domestic functions.

15. The non-transitory computer-readable medium of claim 11, wherein the method further comprises:
  storing a value that associates the first portion of memory with an identity of the container;
  determining that a function associated with an object within the container has been called from a second thread;
  saving one or more values indicating a state of a second portion of memory associated with the second thread;
  recalling the stored value to identify the first portion of memory;
  replacing the second portion of memory with the first portion of memory;
  calling the function from within the second thread; and restoring the second portion of memory using the saved one or more values.

\* \* \* \* \*